United States Patent
Rambo et al.

(10) Patent No.: US 12,320,261 B2
(45) Date of Patent: Jun. 3, 2025

(54) GAS TURBINE ENGINE HAVING A HYDRAULIC FAN BRAKE

(71) Applicant: General Electric Company, Schenectady, NY (US)

(72) Inventors: Jeffrey D. Rambo, Mason, OH (US); Brandon W. Miller, Middletown, OH (US); Arthur W. Sibbach, Boxford, MA (US); Scott D. Hunter, Seattle, WA (US); Ryan T. Roehm, West Chester, OH (US)

(73) Assignee: GENERAL ELECTRIC COMPANY, Evendale, OH (US)

( * ) Notice: Subject to any disclaimer, the term of this patent is extended or adjusted under 35 U.S.C. 154(b) by 0 days.

(21) Appl. No.: 18/416,269

(22) Filed: Jan. 18, 2024

(65) Prior Publication Data

US 2025/0027427 A1    Jan. 23, 2025

Related U.S. Application Data

(60) Provisional application No. 63/514,172, filed on Jul. 18, 2023.

(51) Int. Cl.
*F01D 21/00* (2006.01)
*F02C 7/06* (2006.01)
(Continued)

(52) U.S. Cl.
CPC .............. *F01D 21/006* (2013.01); *F02C 7/06* (2013.01); *F02C 9/26* (2013.01); *F04C 2/084* (2013.01);
(Continued)

(58) Field of Classification Search
CPC .......... F01D 21/006; F01D 21/00; F02C 7/06; F02C 9/26; F15B 2211/422; F15B 13/04;
(Continued)

(56) References Cited

U.S. PATENT DOCUMENTS

| 2,849,086 A | 8/1958 | Martin | |
| 3,001,587 A * | 9/1961 | Larkin | B64D 35/00 184/6 |

(Continued)

FOREIGN PATENT DOCUMENTS

| FR | 3127024 A1 | 3/2023 |
| FR | 3127025 A1 | 3/2023 |

(Continued)

*Primary Examiner* — Woody A Lee, Jr.
*Assistant Examiner* — Joshua R Beebe
(74) *Attorney, Agent, or Firm* — Venable LLP; Michael C. Sanko; Michele V. Frank

(57) ABSTRACT

A turbine engine having a longitudinal centerline axis. The turbine engine including a fan comprising a plurality of fan blades that rotate about the longitudinal centerline axis and a rotational component coupled to the fan. The turbine engine including a fluid circuit for supplying fuel or lubricant to the turbine engine and a hydraulic fan brake coupled to the fluid circuit to prevent rotation of the rotational component, thus preventing rotation of the fan. The hydraulic fan brake including a hydraulic cylinder fluidly coupled to the fluid circuit and a valve coupled to the hydraulic cylinder and having a first valve position that disengages the hydraulic fan brake to allow rotation of the rotational component and a second valve position that engages the hydraulic fan brake to prevent rotation of the rotational component.

19 Claims, 9 Drawing Sheets

(51) Int. Cl.
*F02C 9/26* (2006.01)
*F04C 2/08* (2006.01)
*F15B 13/04* (2006.01)

(52) U.S. Cl.
CPC ........ *F15B 13/04* (2013.01); *F05D 2260/902* (2013.01); *F05D 2260/98* (2013.01)

(58) Field of Classification Search
CPC .. F16K 31/1221; F16K 31/1223; F04C 2/084; F05D 2260/902; F05D 2260/98
See application file for complete search history.

(56) References Cited

U.S. PATENT DOCUMENTS

| | | | |
|---|---|---|---|
| 4,376,614 A | | 3/1983 | Woodruff |
| 4,799,354 A | * | 1/1989 | Midgley .................... F02C 7/36 60/788 |
| 5,782,323 A | * | 7/1998 | Mills ........................ F16D 65/18 188/264 G |
| 6,845,831 B2 | | 1/2005 | Smith et al. |
| 7,849,668 B2 | * | 12/2010 | Sheridan ................. F01D 25/20 384/473 |
| 8,491,436 B2 | | 7/2013 | Duong et al. |
| 10,107,135 B2 | | 10/2018 | Schwarz et al. |
| 10,167,873 B2 | * | 1/2019 | Sheridan ................... F02C 7/32 |
| 10,267,233 B2 | | 4/2019 | Mastro |
| 10,287,977 B2 | | 5/2019 | Wotzak et al. |
| 10,526,913 B2 | | 1/2020 | Roberge |
| 10,526,975 B2 | | 1/2020 | Howell et al. |
| 10,746,181 B2 | | 8/2020 | Roberge |
| 10,815,823 B2 | * | 10/2020 | Roberge .................... F02K 3/06 |
| 10,837,312 B2 | | 11/2020 | Gates et al. |
| 10,851,714 B2 | | 12/2020 | Roach et al. |
| 11,268,530 B2 | | 3/2022 | Roberge |
| 11,441,490 B2 | | 9/2022 | Smith |
| 2002/0148990 A1 | * | 10/2002 | Kandel ................ F16K 31/1221 251/14 |
| 2009/0173586 A1 | * | 7/2009 | Seeger .................. B60T 13/745 188/72.1 |
| 2014/0331639 A1 | | 11/2014 | Raimarckers et al. |
| 2015/0369213 A1 | * | 12/2015 | Jakobsson ............... F03D 15/00 416/153 |
| 2016/0251977 A1 | * | 9/2016 | Gates ........................ F01D 5/06 416/169 R |
| 2017/0114661 A1 | * | 4/2017 | Schwarz .................. F01D 25/20 |
| 2018/0348797 A1 | * | 12/2018 | Kamiya ................ B60T 13/686 |
| 2020/0232446 A1 | * | 7/2020 | Hawkins ................ F03D 80/70 |
| 2021/0246834 A1 | | 8/2021 | Lepretre |

FOREIGN PATENT DOCUMENTS

| | | |
|---|---|---|
| FR | 3129436 A1 | 5/2023 |
| FR | 3129690 A1 | 6/2023 |
| FR | 3130747 A1 | 6/2023 |
| FR | 3130875 A1 | 6/2023 |
| WO | 200621078 A1 | 3/2006 |

\* cited by examiner

GAS TURBINE ENGINE HAVING A HYDRAULIC FAN BRAKE

CROSS REFERENCE TO RELATED APPLICATIONS

This application claims priority to U.S. Provisional Application No. 63/514,172, filed Jul. 18, 2023, the entire contents of which are incorporated by reference in their entirety.

TECHNICAL FIELD

The present disclosure relates generally to a turbine engine, and more particularly to a turbine engine having a hydraulic fan brake.

BACKGROUND

A turbine engine generally includes a fan and a core section arranged in flow communication with one another. The fan includes a plurality of fan blades that rotate about a longitudinal centerline axis of the engine.

BRIEF DESCRIPTION OF THE DRAWINGS

Features and advantages will be apparent from the following, more particular, description of various exemplary embodiments, as illustrated in the accompanying drawings, wherein like reference numbers generally indicate identical, functionally similar, and/or structurally similar elements.

DETAILED DESCRIPTION

Figure 1:
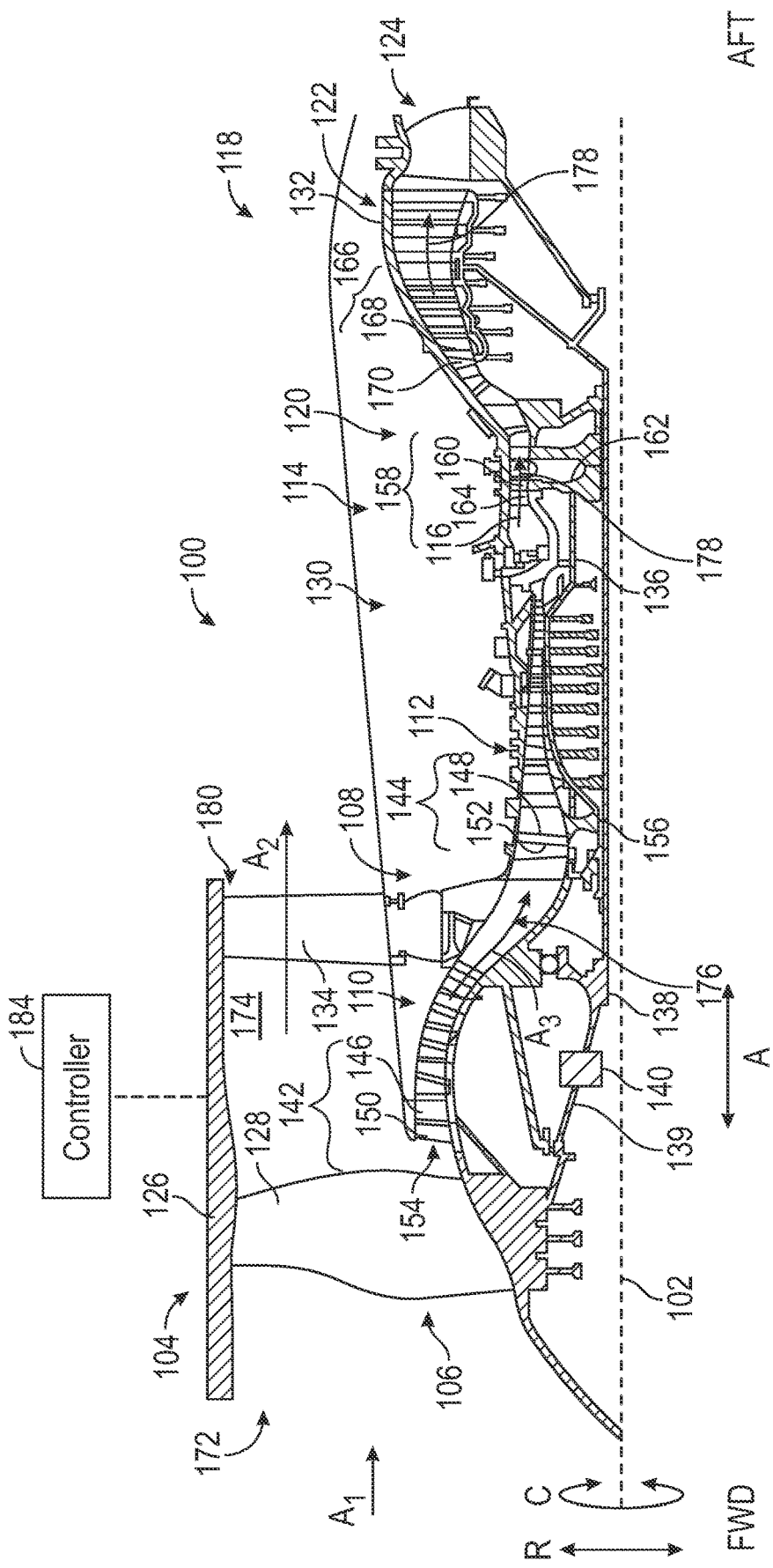
FIG. 1 illustrates a schematic, cross-sectional view of a ducted, indirect-drive gas turbine engine, taken along a longitudinal centerline axis of the engine, according to the present disclosure.

Features, advantages, and embodiments of the present disclosure are set forth or apparent from a consideration of the following detailed description, drawings, and claims. Moreover, the following detailed description is exemplary and intended to provide further explanation without limiting the scope of the disclosure as claimed.

Various embodiments of the present disclosure are discussed in detail below. While specific embodiments are discussed, this is done for illustration purposes only. A person skilled in the relevant art will recognize that other components and configurations may be used without departing from the spirit and the scope of the present disclosure.

As used herein, the terms "first" and "second" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "forward" and "aft" refer to relative positions within a turbine engine or a vehicle, and refer to the normal operational attitude of the turbine engine or the vehicle. For example, with regard to a turbine engine, forward refers to a position closer to an engine inlet and aft refers to a position closer to an engine nozzle or an exhaust.

As used herein, the terms "low," "mid" (or "mid-level"), and "high," or their respective comparative degrees (e.g., "lower" and "higher", where applicable), when used with compressor, turbine, shaft, fan, or turbine engine components, each refers to relative pressures, relative speeds, relative temperatures, and/or relative power outputs within an engine unless otherwise specified. For example, a "low power" setting defines the engine configured to operate at a power output lower than a "high power" setting of the engine, and a "mid-level power" setting defines the engine configured to operate at a power output higher than a "low power" setting and lower than a "high power" setting. The terms "low," "mid" (or "mid-level"), or "high" in such aforementioned terms may additionally, or alternatively, be understood as relative to minimum allowable speeds, pressures, or temperatures, or minimum or maximum allowable speeds, pressures, or temperatures relative to normal, desired, steady state, etc., operation of the engine.

The terms "coupled," "fixed," "attached," "connected," and the like, refer to both direct coupling, fixing, attaching, or connecting, as well as indirect coupling, fixing, attaching, or connecting through one or more intermediate components or features, unless otherwise specified herein. The terms include integral and unitary configurations (e.g., blisk rotor blade systems).

The singular forms "a," "an," and "the" include plural references unless the context clearly dictates otherwise.

As used herein, the terms "axial" and "axially" refer to directions and orientations that extend substantially parallel to a centerline of the turbine engine. Moreover, the terms "radial" and "radially" refer to directions and orientations that extend substantially perpendicular to the centerline of the turbine engine. In addition, as used herein, the terms "circumferential" and "circumferentially" refer to directions and orientations that extend arcuately about the centerline of the turbine engine.

As used herein, a "fluid" includes a liquid, a gas, or a material that continuously deforms under an applied shear stress or external force (e.g., a material that can flow). The term fluid includes materials that are or include a supercritical fluid, an emulsion, a suspension (e.g., a heterogenous mixture in which solute particles do not dissolve but are suspended through the solvent), a dispersion of droplets within a liquid or gas, etc. Moreover, the term "hydraulic fluid" includes any incompressible fluid.

As used herein, "windmill" or "windmilling" is a condition when the fan and the low-pressure shaft of the turbine engine continue to rotate at low speeds, while the high-pressure shaft rotates slowly or even stops. Windmilling can occur when the turbine engine is shutdown, but air still flows across the fan, such as during an in-flight engine shutdown or when the turbine engine is on the ground and the fan is rotating in the presence of wind when the turbine engine is shutdown. Windmilling on the ground can occur in a reverse direction from a fan rotation direction that produces positive thrust during engine operation.

During engine operation, a gearbox assembly of a turbine engine is utilized to transfer power and torque from a turbine shaft, such as a low-pressure shaft, to the fan of the turbine engine. The gearbox assembly is an epicyclic gear assembly and includes a gear assembly including a sun gear, two or more planet gears secured by a planet carrier, and a ring gear. For example, the gear assembly can be configured in a star arrangement in which the ring gear rotates, and the planet carrier is held stationary. In some embodiments, the gear assembly is configured in a planetary arrangement in which the ring gear is held stationary, and the planet carrier rotates such that the plurality of planet gears rotates about a longitudinal centerline axis of the turbine engine. In operation, the gearbox assembly transfers the torque transmitted from the turbine shaft operating at a first speed to a fan shaft rotating at a second, lower speed. Such a gearbox assembly can be utilized in turbine engines for propelling aircraft, such as commercial aircraft, or the like. The gearbox assembly can also be utilized as an accessory gearbox to transmit torque and power to one or more accessories of the turbine engine or of the aircraft.

The gearbox assembly includes one or more bearings that allow rotation of the plurality of planet gears about the one or more bearings. A lubrication system supplies lubricant (e.g., oil) to the gearbox assembly for lubricating various components of the gearbox assembly, such as, for example, the gears and the bearings. The bearings may be, for example, but not limited to, hydrodynamic journal bearings or roller bearings. The bearings typically require a steady supply of lubricant during all operational phases of the turbine engine in order to properly lubricate the bearings to prevent damage due to sliding contact for hydrodynamic journal bearings or even for the generic gear mesh interface. The gearbox assembly may experience long duration, continued rotation following a shutdown of the turbine engine, such as that occurring during windmilling. In such instances, the gears and the bearings can be affected by not receiving enough lubricant for lubricating the gears and the bearings. For example, during windmilling, the rotational speed of the shafts may be too low to power the lubricant pump to pump the lubricant to the gearbox assembly. In some instances, e.g., during operation of the turbine engine (e.g., in-flight), the lubrication system may lose pressure (e.g., due to a failure of the lubricant pump or other components of the lubrication system), such that the lubrication system is unable to provide the lubricant to the gearbox assembly via the lubricant pump and the lubricant supply line.

The criticality of the lubricant interruptions increases when the bearings are journal bearings, since the absence of lubricant at the journal bearings can lead to a journal bearing failure and subsequent gearbox failure, which may cause the low speed shaft to lock up permanently. Journal bearing seizure occurs when there is contact between the planet pin and the bore of the planet gear, thereby causing a significant increase of wear and friction. If journal bearing and pin contact occurs during high power operation this will lead to welding of the two components.

Some gearbox assemblies include an auxiliary lubrication system to supply lubricant to the journal bearings and to the gears to prevent damage to the gearbox assembly due to inadequate lubricant supply during windmilling. Such auxiliary lubrication systems, however, typically require an additional pump (e.g., a fan-driven pump or an electrical pump) that adds weight to the turbine engine. The lubricant pump requires added complexity to provide the lubricant during high speeds, such as during operation of the turbine engine, and during low speeds, such as during windmilling (e.g., in-flight or on the ground). Further, the lubricant pump requires added complexity to provide the lubricant while the fan windmills in either direction (e.g., the fan rotates clockwise or counterclockwise).

Accordingly, the present disclosure provides a hydraulic fan brake to prevent rotation of the fan in such windmilling conditions. The hydraulic fan brake may be an active, controlled fan brake or a passive fan brake. By preventing rotation of the fan in both the operational direction and the opposite direction of the operational direction, the auxiliary lubrication system may be simplified by reducing or removing some of the additional required equipment that adds weight and complexity to the turbine engine. The hydraulic fan brake of the present disclosure may be provided at one or more positions within the engine at a rotational component that is directly or indirectly coupled to the fan.

FIG. 1 shows a schematic, cross-sectional view of a turbine engine 100, taken along a longitudinal centerline axis 102 of the turbine engine 100, according to an embodiment of the present disclosure. As shown in FIG. 1, the turbine engine 100 defines an axial direction A (extending parallel to the longitudinal centerline axis 102), a radial direction R that is normal to the axial direction A, and a circumferential direction C extending about the longitudinal centerline axis 102. In general, the turbine engine 100 includes a fan section 104 and a turbo-engine 130 disposed downstream from the fan section 104.

The turbo-engine 130 includes, in serial flow relationship, a compressor section 108, a combustion section 114, and a turbine section 118. The turbo-engine 130 is substantially enclosed with an outer casing 132 that is substantially tubular and defines an annular inlet 172. As schematically shown in FIG. 1, the compressor section 108 includes a booster or a low-pressure (LP) compressor 110 followed downstream by a high-pressure (HP) compressor 112. The combustion section 114 includes a combustor 116 and is downstream of the compressor section 108. The turbine section 118 is downstream of the combustion section 114 and includes a high-pressure (HP) turbine 120 followed downstream by a low-pressure (LP) turbine 122. The turbo-engine 130 further includes a jet exhaust nozzle section 124 that is downstream of the turbine section 118, a high-pressure (HP) shaft 136 or a spool, and a low-pressure (LP) shaft 138. The HP shaft 136 drivingly connects the HP turbine 120 to the HP compressor 112. The HP turbine 120 and the HP compressor 112 rotate in unison through the HP shaft 136. The LP shaft 138 drivingly connects the LP turbine 122 to the LP compressor 110. The LP turbine 122 and the LP compressor 110 rotate in unison through the LP shaft 138. The compressor section 108, the combustion section 114, the turbine section 118, and the jet exhaust nozzle section 124 together define a core air flow path.

For the embodiment depicted in FIG. 1, the fan section 104 includes a fan 106 (e.g., a variable pitch fan) having a plurality of fan blades 128 coupled to a disk (not shown) in a spaced apart manner. As depicted in FIG. 1, the fan blades 128 extend outwardly from the disk generally along the radial direction R. In the case of a variable pitch fan, the plurality of fan blades 128 are rotatable relative to the disk about a pitch axis by virtue of the fan blades 128 being operatively coupled to an actuation member (not shown) configured to collectively vary the pitch of the fan blades 128 in unison. The fan blades 128, the disk, and the actuation member are together rotatable about the longitudinal centerline axis 102 via a fan shaft 139 that is powered by the LP shaft 138 across a power gearbox, also referred to as a gearbox assembly 140. In this way, the fan 128 is drivingly coupled to, and powered by, the turbo-engine 130 and the turbine engine 100 is an indirect drive engine. The gearbox assembly 140 is shown schematically in FIG. 1. The gearbox assembly 140 is a reduction gearbox assembly for adjusting the rotational speed of the fan shaft 139 and, thus, the fan 128 relative to the LP shaft 138 when power is transferred from the LP shaft 138 to the fan shaft 139.

Referring still to the exemplary embodiment of FIG. 1, the fan section 104 includes an annular fan casing or a nacelle 126 that circumferentially surrounds the fan 128 and at least a portion of the turbo-engine 130 by a plurality of outlet guide vanes 134 that are circumferentially spaced about the nacelle 126 and the turbo-engine 130. Moreover, a downstream section of the nacelle 126 extends over an outer portion of the turbo-engine 130, and, with the outer casing 132, defines a bypass airflow passage 174 therebetween.

The LP compressor 110 and the HP compressor 112 include a plurality of compressor stages 142, 144, respectively, in which a respective set of compressor rotor blades 146, 148 rotate relative to a respective set of compressor stator vanes 150, 152 to compress or to pressurize gas entering through an inlet 154. Each compressor stage 144 of the HP compressor 112 includes multiple compressor blades 148 provided on a rotor disk 156 (or the blades 148 and the rotor disk 156 are integrated together, referred to as a blisk), also referred to herein as compressor rotor blades 148 or rotor blades 148. Each compressor blade 148 extends radially outwardly relative to the longitudinal centerline axis 102, from a blade platform to a blade tip. Compressor stator vanes 152, also referred to herein as stator vanes 152, are positioned upstream/downstream of and adjacent to the compressor blades 148. The rotor disk 156 for a stage of compressor blades 148 is mounted to the HP shaft 136. The compressor stage 144 of the HP compressor 112 may refer to a single disk of the compressor blades 148 or may refer to both the single disk of the compressor blades 148 and an adjacent single disk of compressor stator vanes 152. Either meaning can apply within the context of this disclosure without loss of clarity. The same description applies to each compressor stage 142 of the LP compressor 110 (e.g., each compressor stage 142 of the LP compressor 110 includes multiple compressor rotor blades 146 and compressor stator vanes 150).

The HP turbine 120 has one or two turbine stages 158. In a single turbine stage 158, turbine blades 160 are provided on a rotor disk 162, also referred to herein as rotor blades 160. Each turbine blade 160 extends radially outwardly relative to the longitudinal centerline axis 102, from a blade platform to a blade tip. The HP turbine 120 can also include turbine stator vanes 164, also referred to as stator turbine nozzles. The HP turbine 120 may have an upstream nozzle adjacent an exit of the combustor 116 and a downstream nozzle aft of the rotor (e.g., turbine blades 160) or the HP turbine 120 may have a nozzle upstream of the rotor blades (e.g., turbine blades 160) or downstream of the rotor blades.

Air exiting the HP turbine 120 enters the LP turbine 122, which has a plurality of turbine stages 166 of turbine rotor blades 168. The LP turbine 122 can have three or more stages. In a single LP turbine stage 166 (containing a plurality of turbine rotor blades 168 coupled to the LP shaft 138), the turbine rotor blades 168 are provided on a rotor disk (connected to the LP shaft 138) and extend radially outwardly relative to the longitudinal centerline axis 102, from a blade platform to a blade tip. The LP turbine 122 can also include turbine stator vanes 170, also referred to as stator turbine nozzles. The LP turbine 122 may have both an upstream nozzle and a downstream nozzle aft of a turbine stage 166, followed by the core exhaust nozzle 124.

During operation of the turbine engine 100, a volume of air $A_1$ enters the turbine engine 100 through the annular inlet 172 of the nacelle 126. As the volume of air $A_1$ passes across the fan blades 128, a first portion of air $A_2$, also referred to as a bypass air flow $A_2$, is routed into the bypass air flow passage 174, and a second portion of air $A_3$, also referred to as core air, is routed into the upstream section of a core air flow passage 176 through the annular inlet 172 of the LP compressor 110. The ratio between the bypass air $A_2$ and the core air $A_3$ is commonly known as a bypass ratio. The pressure of the core air $A_3$ is then increased, generating compressed air that is routed through the HP compressor 112 and into the combustion section 114, wherein the compressed air is mixed with fuel and ignited to generate combustion gases 178.

The combustion gases 178 are routed into the HP turbine 120 and expanded through the HP turbine 120 where a portion of thermal energy and kinetic energy from the combustion gases 178 is extracted via one or more stages of the HP turbine stator vanes 164 and HP turbine rotor blades 160 that are coupled to the HP shaft 136. This causes the HP shaft 136 to rotate, thereby supporting operation of the HP compressor 112 (self-sustaining cycle). In this way, the combustion gases 178 do work on the HP turbine 120. The combustion gases 178 are then routed into the LP turbine 122 and expanded through the LP turbine 122. Here, a second portion of the thermal energy and the kinetic energy is extracted from the combustion gases 178 via one or more stages of the LP turbine stator vanes 170 and the LP turbine rotor blades 168 that are coupled to the LP shaft 138. This causes the LP shaft 138 to rotate, thereby supporting operation of the LP compressor 110 (self-sustaining cycle) and rotation of the fan 106 via the gearbox assembly 140. In this way, the combustion gases 178 do work on the LP turbine 122.

The combustion gases 178 are subsequently routed through the jet exhaust nozzle 124 of the turbo-engine 130 to provide propulsive thrust. Simultaneously, the bypass air A2 is routed through the bypass air flow passage 174 before being exhausted from a fan nozzle exhaust 180, also providing propulsive thrust. The HP turbine 120, the LP turbine 122, and the jet exhaust nozzle 124 at least partially define a hot gas pas for routing the combustion gases 178 through the turbo-engine 130.

A controller 184 is in communication with the turbine engine 100 for controlling aspects of the turbine engine 100. For example, the controller 184 is in two-way communication with the turbine engine 100 for receiving signals from various sensors and control systems of the turbine engine 100 and for controlling components of the turbine engine 100, as detailed further below. The controller 184, or components thereof, may be located onboard the turbine engine 100, onboard the aircraft, or may be located remote from each of the turbine engine 100 and the aircraft. The controller 184 can be a Full Authority Digital Engine Control (FADEC) that controls aspects of the turbine engine 100.

The controller 184 may be a standalone controller or may be part of an engine controller to operate various systems of the turbine engine 100. In this embodiment, the controller 184 is a computing device having one or more processors and a memory. The one or more processors can be any suitable processing device, including, but not limited to, a microprocessor, a microcontroller, an integrated circuit, a logic device, a programmable logic controller (PLC), an application specific integrated circuit (ASIC), or a Field Programmable Gate Array (FPGA). The memory can include one or more computer-readable media, including, but not limited to, non-transitory computer-readable media, a computer readable non-volatile medium (e.g., a flash memory), a RAM, a ROM, hard drives, flash drives, or other memory devices.

The memory can store information accessible by the one or more processors, including computer-readable instructions that can be executed by the one or more processors. The instructions can be any set of instructions or a sequence of instructions that, when executed by the one or more processors, cause the one or more processors and the controller 184 to perform operations. The controller 184 and, more specifically, the one or more processors are programmed or configured to perform these operations, such as the operations discussed further below. In some embodiments, the instructions can be executed by the one or more processors to cause the one or more processors to complete any of the operations and functions for which the controller 184 is configured, as will be described further below. The instructions can be software written in any suitable programming language or can be implemented in hardware. Additionally, or alternatively, the instructions can be executed in logically or virtually separate threads on the processors. The memory can further store data that can be accessed by the one or more processors.

The technology discussed herein makes reference to computer-based systems and actions taken by, and information sent to and from, computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

The turbine engine 100 depicted in FIG. 1 is by way of example only. In other embodiments, the gas turbine engine may have any other suitable configuration, including, for example, any other suitable number or configurations of shafts or spools, fan blades, turbines, compressors, or a combination thereof. The gearbox assembly 140 may have any suitable configuration, including, for example, a star gear configuration, a planet gear configuration, a single-stage, a multi-stage, epicyclic, non-epicyclic, etc., as detailed further below. The gearbox assembly 140 may have a gear ratio in a range of 2.5:1 to 5:1, 3:1 to 4:1, 3:5 to 4:1, 3.25:1 to 3.5:1, or 4:1 to 5:1. The fan assembly may be any suitable fixed-pitched assembly or variable-pitched assembly. The turbine engine 100 may include additional components not shown in FIG. 1, such as rotor blades, stator vanes, etc. The fan assembly may be configured in any other suitable manner (e.g., as a variable pitch fan or a fixed pitch fan) and further may be supported using any other suitable fan frame configuration. Moreover, in other exemplary embodiments any other suitable number or configuration of compressors turbines, shafts or a combination thereof may be provided. In other exemplary embodiments, the engine may also be a direct drive engine, which does not have a power gearbox (e.g. no gearbox assembly 140). The fan speed is the same as the LP shaft speed for a direct drive engine. In still other exemplary embodiments, aspects of the present disclosure may be incorporated into any other suitable turbine engine, including, but not limited to, turbofan engines, propfan engines, turbojet engines, turboprop, and turboshaft engines, aviation-based turbine engines, marine-based turbine engines, land-based turbine engines, industrial turbine engines, power generation turbine engines, etc.

As noted, the high-pressure compressors and the high-pressure turbines and the low-pressure compressors and the low-pressure turbines include one or more stages each having two types of blades: stator blades and rotor blades. The blades, whether stator or rotor, are arranged in a circumferential manner about the longitudinal centerline axis 102 (FIG. 1). That is, each stage of the compressor and the turbine is associated with a ring or a circumferential row of stator blades and a ring or a circumferential row of rotor blades. The rotor blades or the stator blades are axisymmetric about the longitudinal centerline axis 102.

Figure 2:
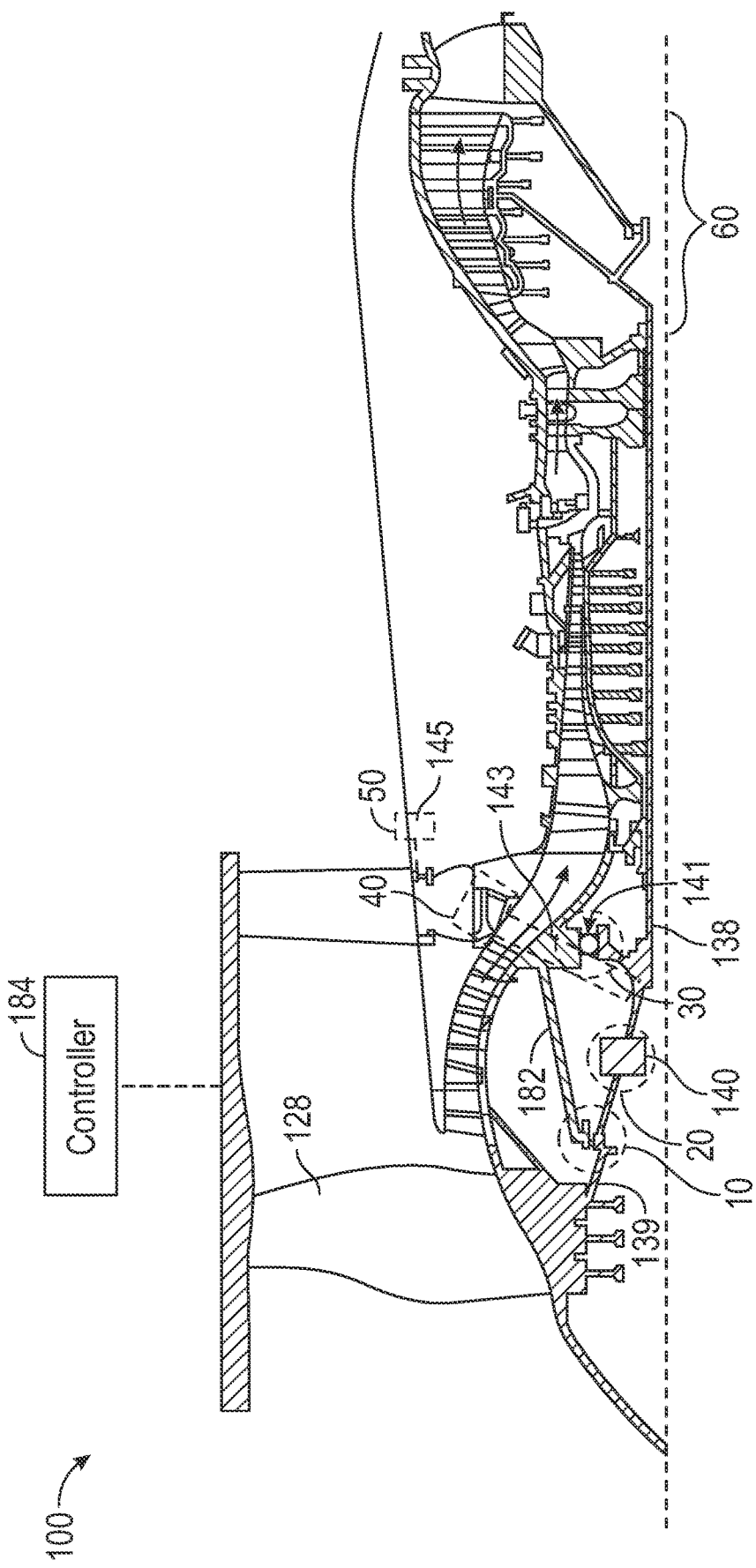
FIG. 2 illustrates a schematic, cross-sectional view of the gas turbine engine of FIG. 1 with optional locations for a hydraulic fan brake, according to the present disclosure.

FIG. 2 illustrates a cross-sectional view of the turbine engine 100 of FIG. 1 highlighting different locations along the turbine engine 100 that a hydraulic fan brake according to the present disclosure may be located. As noted above, the hydraulic fan brake is included to prevent rotation of the fan blades 128 in both the direction of rotation during engine operation and in an opposite direction of the direction of rotation during engine operation. The hydraulic fan brake is coupled, either directly or indirectly, with a rotational component of the low-speed rotor system (e.g., the low-pressure shaft, LP turbine, or LP compressor) that is, in turn, coupled, either directly or indirectly, with the fan blades 128. For example, the rotational component may be the LP shaft 138. In other cases, the rotational component is another rotating component that is directly or indirectly rotationally coupled to the LP shaft 138. Accordingly, the hydraulic fan brake of the present disclosure may be located anywhere along the low-pressure rotor system.

FIG. 2 illustrates six exemplary locations for the hydraulic fan brake, although, as noted above, other locations are contemplated. The hydraulic fan brake of the present disclosure may be located at one or more of the exemplary locations illustrated in FIG. 2. For example, a first location 10 for the hydraulic fan brake is coupled to a fan shaft 139 rotationally coupled to the LP shaft 138. The first location 10 may be anywhere along the fan shaft 139 up to and including, the gearbox assembly 140 (e.g., a second location 20).

The second location 20 for the hydraulic fan brake is at a rotational component of the gearbox assembly 140, such as, for example, the sun gear, the ring gear, or the plurality of planet gears and the engine frame. The gearbox assembly 140 is illustrated schematically in FIG. 2, however, the gearbox assembly 140 is mounted to an engine frame 182 to allow for transfer of the torque from the LP shaft 138 to the fan shaft 139, in the manner discussed above. The hydraulic fan brake may be coupled to a rotational shaft extending from the gearbox assembly 140, such as the input shaft or the output shaft.

A third location 30 for the hydraulic fan brake is at a forward bearing assembly 141 between the LP shaft 138 and the engine frame 182. A fourth location 40 for the hydraulic fan brake is at the power takeoff device 143 that is rotationally coupled to the LP shaft 138. A fifth location 50 is at an accessory gearbox 145, at one or more of the gears of the accessory gearbox 145. The accessory gearbox 145 is configured to transmit torque and power to one or more accessories of the turbine engine 100. A sixth location 60 is anywhere within a sump area of the turbine engine 100. For example, the sixth location 60 may be at the LP shaft 138 or a shaft extension piece of the LP shaft 138. The sixth location 60 may be located at one or more of the bearing assembly locations coupled to the LP shaft 138. The hydraulic fan brake may be located at any bearing assembly within the turbine engine 100 that is operationally coupled to the fan shaft 139 or the LP shaft 138.

A hydraulic fan brake may be located at any one or more of the aforementioned locations, including, any combination of one or more of the aforementioned locations. Thus, the turbine engine 100 may include a single hydraulic fan brake or a plurality of hydraulic fan brakes. The hydraulic fan brakes of the present disclosure may mechanically interface with at least one feature of the low-pressure spool that may include, for example, the gearbox assembly, the fan shaft, the coupling shaft, the low-pressure shaft, a rotational component of the low-pressure turbine, and/or a rotational component of the low-pressure compressor.

As is well-known in the art, additional bearing assemblies are located within the turbine engine 100 to facilitate relative rotation of various components. The hydraulic fan brake may be located at any bearing assembly between a rotational component that, directly or indirectly, drives rotation of the fan blades 128. For example, the first location 10 and the third location 30 both include bearing assemblies at which the hydraulic fan brake may be located.

FIGS. 3A to 7 illustrate various hydraulic fan brakes according to the present disclosure that may be employed at one or more of the locations described with respect to FIG. 2. The hydraulic fan brakes may be coupled to existing lubricant systems or fuel systems such that the pressurized fluid of the hydraulic fan brakes is provided by the engine fuel system or the engine lubricant system. That is, existing fluid circuits, such as fuel circuits or oil hydraulic circuits in the turbine engine 100 are employed to drive hydraulic actuators to actuate the brakes. The fluid provided in the hydraulic fan brakes of the present disclosure is an incompressible fluid, such as fuel or oil. Accordingly, when the hydraulic fan brakes of the present disclosure are driven by engine fuel pressure or engine lubricating systems, the brakes may be passively and automatically actuated upon cessation of engine operation (which results in cessation of engine fuel pressure and engine lubricating systems). In other cases, the hydraulic fan brakes are controlled by an engine controller.

Figure 3A:
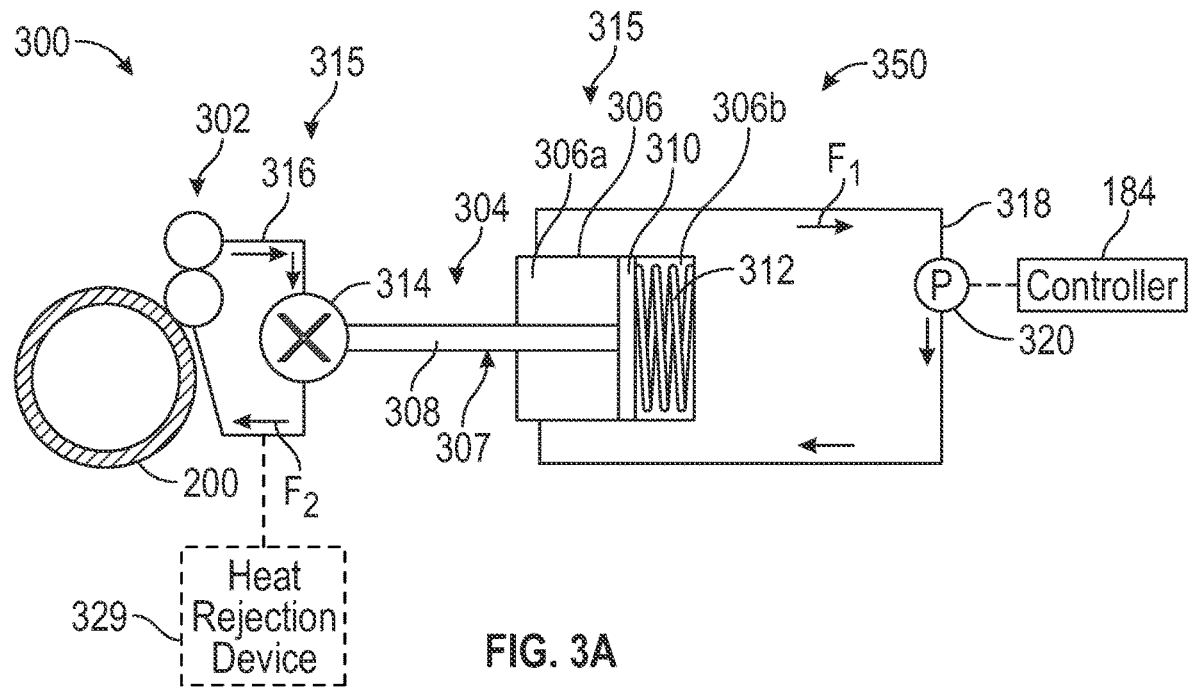
FIG. 3A illustrates a partial schematic, cross-sectional view of a hydraulic fan brake for a gas turbine engine, the hydraulic fan brake being in a disengaged position, according to the present disclosure.
Figure 3B:
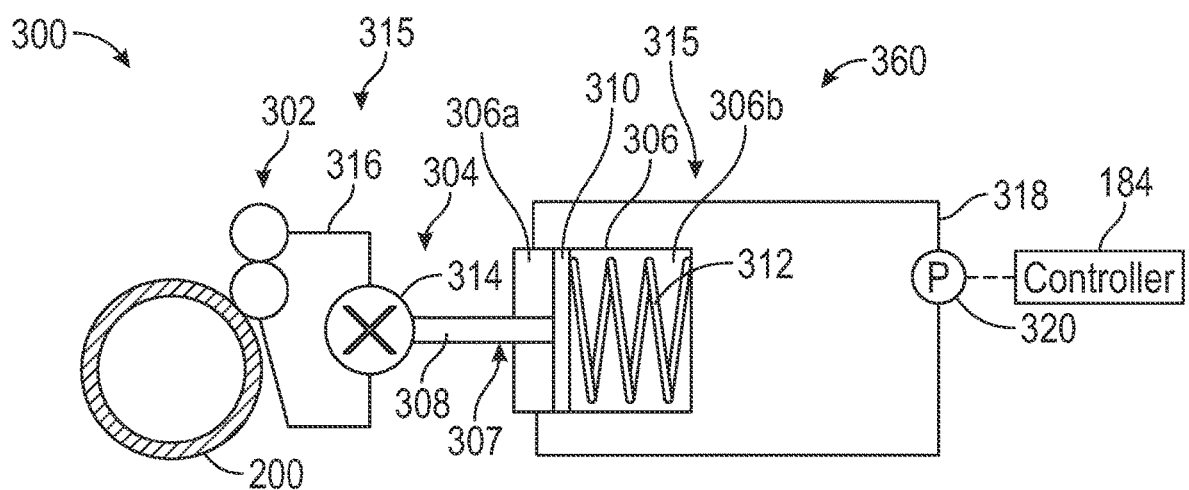
FIG. 3B illustrates a partial schematic, cross-sectional view of a hydraulic fan brake for a gas turbine engine, the hydraulic fan brake being in an engaged position, according to the present disclosure.

FIGS. 3A and 3B illustrate an exemplary hydraulic fan brake 300 that may be located at any of the locations described with respect to FIG. 2. The hydraulic fan brake 300 is illustrated in a disengaged position 350 in FIG. 3A and an engaged position 360 in FIG. 3B. The hydraulic fan brake 300 includes a rotational device 302 and a hydraulic actuator 304. The rotational device 302 is mechanically coupled to a rotational component 200 such that the rotational device 302 allows or prevents rotation of the rotational component 200 based on the condition of the hydraulic fan brake 300, as is described in more detail to follow. The rotational device 302 may be a gear pump, such as the gear pump 370 shown and described with respect to FIG. 3C. The rotational device 302 may be a single gear, such as a single gear 392 shown and described with respect to FIG. 3D. Other rotational devices are contemplated. The hydraulic actuator 304 includes a hydraulic cylinder 306, a piston 307 having a piston shaft 308 and a piston head 310, a biasing member 312, and a valve 314. The hydraulic actuator 304 is fluidly coupled to a fluid circuit 315 for supplying fuel or lubricant to the turbine engine 100. The fluid circuit 315 includes a pressurized manifold 318 and a flow path 316, referred to herein as a first flow path 316. The pressurized manifold 318 is supplied with an incompressible fluid, such as fuel or oil, via a pump 320. The pump 320 may be any positive displacement pump. In the disengaged position 350 of FIG. 3A, the pump 320 is controlled by the controller 184 to supply a first flow of fluid $F_1$ through the pressurized manifold 318. The first flow of fluid $F_1$ enters a first chamber 306a of the hydraulic cylinder 306. The pressure of the fluid in the first chamber 306a moves the piston head 310 to compress the biasing member 312 in a second chamber 306b of the hydraulic cylinder 306 such that the valve 314 is in an open position.

With the valve 314 in an open position (FIG. 3A), also referred to as a first valve position, a second flow of fluid $F_2$ is allowed to recirculate along the first flow path 316, that may be a closed flow path. The second flow of fluid $F_2$ causes the rotational device 302 to rotate, resulting in continuous circulation of the second flow of fluid $F_2$ along the first flow path 316. The rotational device 302, or a shaft of the rotational device 302, may be rotationally coupled to a rotational component 200, which may be any of the rotational components described with respect to FIG. 2. For example, the rotational component 200 may be the LP shaft 138 (FIG. 1), such that, in the disengaged position 350 of FIG. 3A, rotation of the rotational device 302 does not interfere with rotation of the LP shaft 138 (FIG. 1). Thus, the hydraulic fan brake 300 is disengaged and no braking of the rotational component 200 occurs.

In the engaged position 360 of FIG. 3B, the pump 320 is controlled by the controller 184 to cease flow of the first flow of fluid $F_1$ along the flow path of the pressurized manifold 318. In this condition, the biasing member 312 (which is preloaded) releases the compressed energy pushing the piston head 310 and the piston shaft 308 toward the valve 314 resulting in closure of the valve 314, also referred to herein as a closed position or a second valve position. In some examples, the biasing member 312 is a spring, such as a compression spring. With the valve 314 closed, the second flow of fluid $F_2$ is stopped and the rotational device 302 becomes hydraulically locked and no longer rotates. In this condition, the rotational device 302, or a shaft of the rotational device 302 that is coupled to the rotational component 200, stops rotating, which acts as a brake to stop rotation of the rotational component 200.

The hydraulic fan brake 300 may optionally include a heat rejection device 329 as illustrated in FIG. 3A. The heat rejection device 329 may be any device that extracts waste heat from the second fluid flow F2 that is generated by the operation of the rotational device 302. The heat rejection device 329 may dissipate or transmit the waste heat to the atmosphere or to another component within the engine requiring heat addition.

Figure 3C:
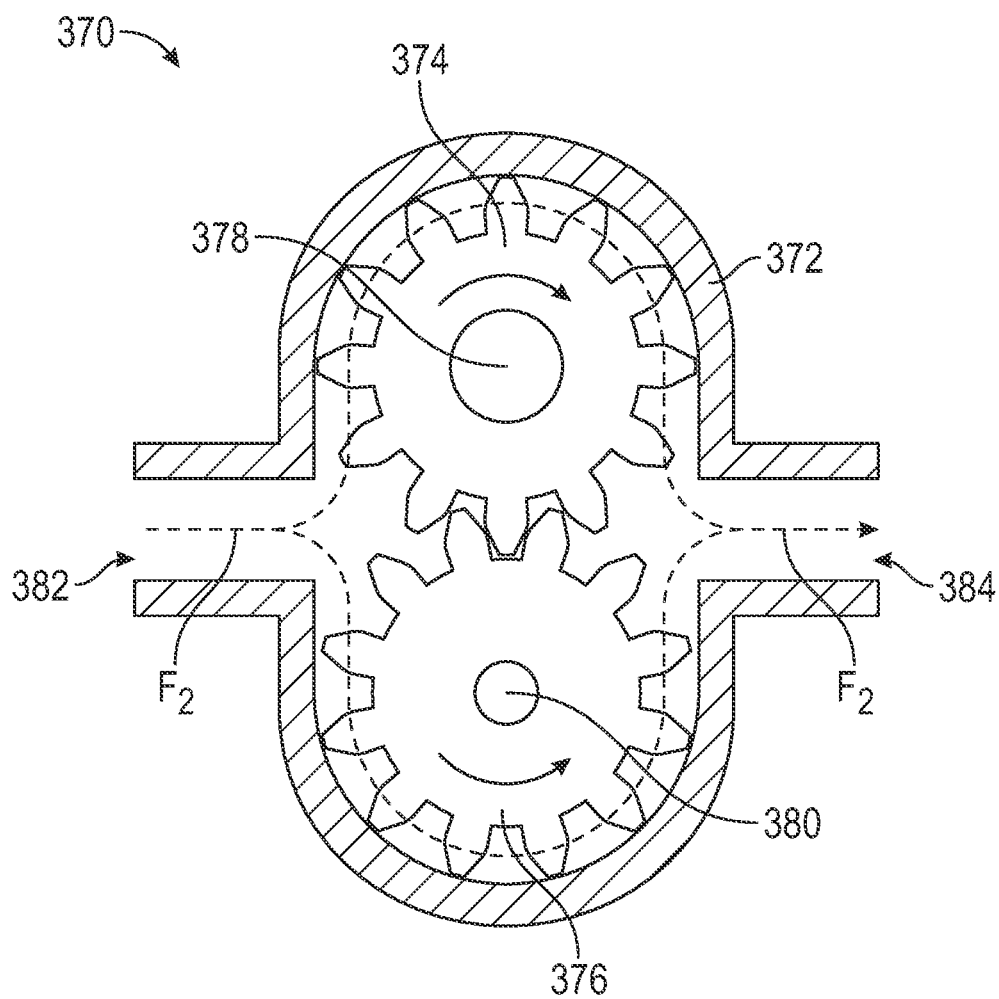
FIG. 3C illustrates a schematic, cross-sectional view of a gear pump for use with the hydraulic fan brake of FIGS. 3A and 3B, according to the present disclosure.

FIG. 3C illustrates a cross-sectional view of an exemplary gear pump 370 that may be the rotational device 302 of FIGS. 3A and 3B. The gear pump 370 includes a housing 372, a first gear 374, and a second gear 376. The first gear 374 includes a first gear shaft 378 and the second gear 376 includes a second gear shaft 380. During operation of the gear pump 370, when the hydraulic fan brake 300 is in the disengaged position 350, the second flow of fluid $F_2$ flowing through the first flow path 316 flows through an inlet 382, around the first gear 374 and the second gear 376, causing rotation therebetween, and out of an outlet 384.

Considering the aspects of FIGS. 3A and 3C together, the rotational component 200 is rotationally coupled, directly or indirectly, to the first gear shaft 378 or the second gear shaft 380. In the disengaged position 350 of FIG. 3A, the first gear 374 and the second gear 376 are caused to rotate by the second flow of fluid $F_2$, thus resulting in continuous circulation of the second flow of fluid $F_2$ along the first flow path 316. Since the first gear shaft 378 or the second gear shaft 380 is rotationally coupled to the rotational component 200, when the gear pump 370 is operating, the rotational component 200 rotates along with the gear shaft to which the rotational component 200 is coupled. Thus, the hydraulic fan brake 300 is disengaged, the gear pump 370 is operational, and the rotational component 200 is capable of rotating.

Considering the aspects of FIGS. 3B and 3C together, the rotational component 200 remains rotationally coupled, directly or indirectly, to the first gear shaft 378 or the second gear shaft 380. In the engaged position 360 of FIG. 3B, the valve 314 is closed such that the second flow of fluid $F_2$ along the first flow path 316 stops, resulting in the gear pump 370 stopping rotation and becoming hydraulically locked. That is, each of the first gear 374 and the second gear 376 is caused to stop rotating as there is no flow therethrough and the gears become locked to one another. With the first gear 374 and the second gear 376 no longer rotating, the respective first gear shaft 378 and the second gear shaft 380 also no longer rotate. Thus, the rotational component 200 that is coupled to the first gear shaft 378 or the second gear shaft 380 is prevented from rotating. Thus, the hydraulic fan brake 300 is engaged. The rotational component 200 is coupled, directly or indirectly, to the fan blades 128 (FIG. 1). Thus, when the rotational component 200 is stopped from rotating, the fan blades 128 are stopped from rotating. Accordingly, in the engaged position 360 of FIG. 3B, the hydraulic fan brake 300 operates to stop rotation of the fan blades 128 (FIG. 1).

Figure 3D:
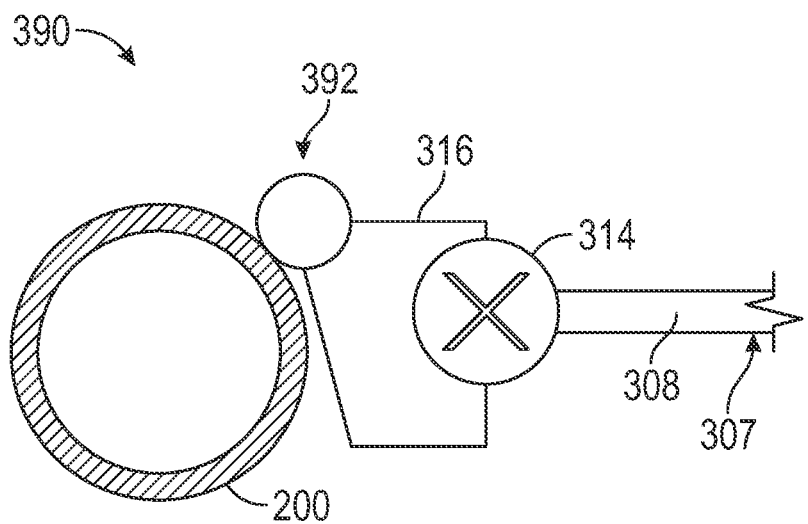
FIG. 3D illustrates a partial schematic, cross-sectional view of a hydraulic fan brake for a gas turbine engine, according to the present disclosure.

As discussed above, the rotational device 302 may be a single gear, such as the single gear 392 of a hydraulic fan brake 390 illustrated in FIG. 3D. Operation of the hydraulic fan brake 390 is the same as operation of the hydraulic fan brake 300. When the second flow of fluid $F_2$ (FIG. 3A) is permitted to flow in the disengaged position 350 (FIG. 3A), the single gear 392 is rotating, thus allowing rotation of the rotational component 200, by way of the rotational coupling between the single gear 392 and the rotational component 200. When the second flow of fluid F2 (FIG. 3B) is not permitted to flow in the engaged position 360 (FIG. 3B), the single gear 392 is not rotating, thus preventing rotation of the rotational component 200, by way of the rotational coupling between the single gear 392 and the rotational component 200. Thus, the rotational component 200 is stopped from rotating when the valve 314 is closed preventing flow through the first flow path 316, and thus preventing rotation of the single gear 392.

In the hydraulic fan brake 300 of FIGS. 3A to 3D, the fluid circuit 315, such as a fuel circuit or an oil circuit (e.g., pressurized manifold 318) provides pressure that maintains pressure on a left side of a hydraulic cylinder to maintain the valve 314 in an open position such that an auxiliary fluid circuit (e.g., the first flow path 316) remains open. A preloaded biasing member, such as a spring 312, actuates the piston 307 to close the valve 314, and thus, to close the auxiliary fluid circuit (e.g., the first flow path 316). This prevents rotation of the rotational device 302, which, in turn, prevents rotation of the rotational component 200. Stated another way, when the valve 314 is open, the brake is disengaged, as shown in FIG. 3A, and, when the valve 314 is closed, the brake is engaged, as shown in FIG. 3B.

Figure 3E:
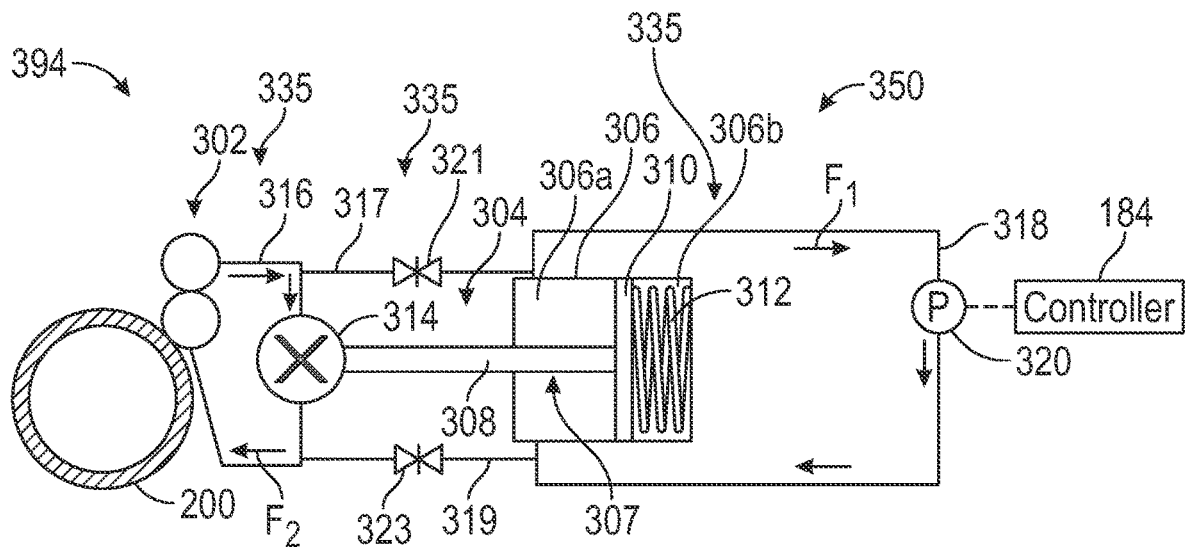
FIG. 3E illustrates a partial schematic, cross-sectional view of a hydraulic fan brake for a gas turbine engine, according to the present disclosure.

In the hydraulic fan brake 300 of FIGS. 3A and 3B, the pressurized manifold 318 and the first flow path 316 are separate flow paths that are fluidly isolated from each other. That is, there is no fluid communication between the first flow path 316 and the pressurized manifold 318. Alternatively, the first flow path 316 and the pressurized manifold 318 may be fluidly coupled. For example, FIG. 3E illustrates a hydraulic fan brake 394 that is the same as the hydraulic fan brake 390 (FIG. 3D) except that the first flow path 316 and the pressurized manifold 318 are fluidly coupled. In the hydraulic fan brake 394, a fluid circuit 335 includes the first flow path 316, the pressurized manifold 318, a second flow path 317, and a third flow path 319. The first flow path 316 and the pressurized manifold 318 are fluidly coupled with the second flow path 317 and the third flow path 319. The second flow path 317 includes a first gate valve 321 and the third flow path 319 includes a second gate valve 323. The first gate valve 321 and the second gate valve 323 control fluid communication between the first flow path 316 and the pressurized manifold 318 to achieve the disengaged position (FIG. 3A) and the engaged position (FIG. 3B) of the hydraulic fan brake 394.

Figure 3F:
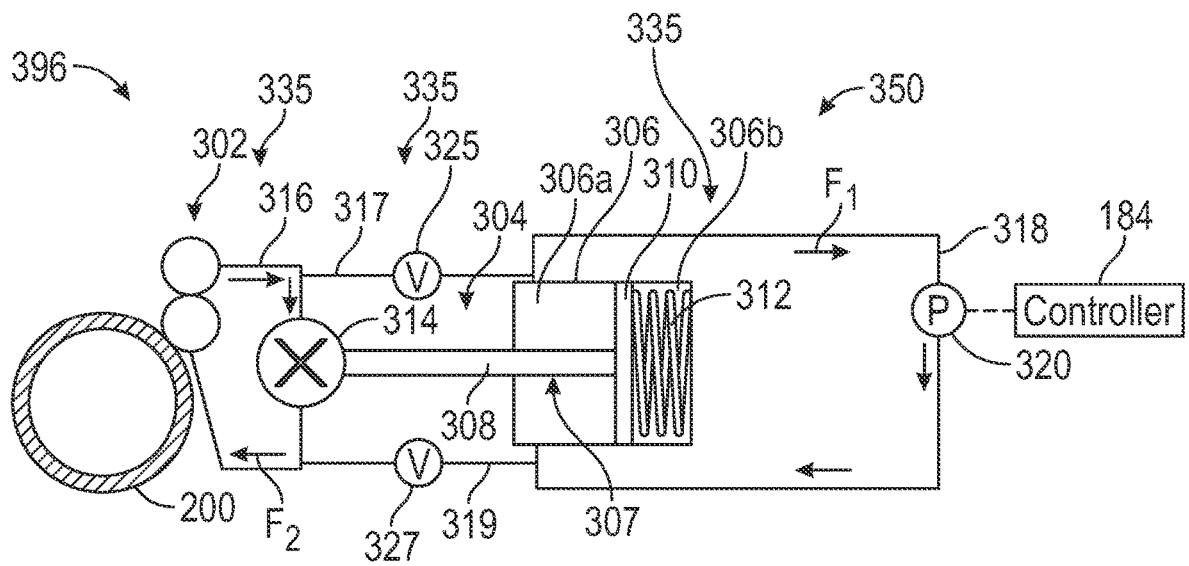
FIG. 3F illustrates a partial schematic, cross-sectional view of a hydraulic fan brake for a gas turbine engine, according to the present disclosure.

In another example, FIG. 3F illustrates a hydraulic fan brake 396 that is the same as the hydraulic fan brake 390 (FIG. 3D) except that the first flow path 316 and the pressurized manifold 318 are fluidly coupled. In the hydraulic fan brake 396, the first flow path 316 and the pressurized manifold 318 are fluidly coupled with either a second flow path 317 or a third flow path 319. When the second flow path 317 is provided, a multi-position valve 325 controls fluid communication between the first flow path 316 and the pressurized manifold 318. When the third flow path 319 is provided, a multi-position valve 327 controls fluid communication between the first flow path 316 and the pressurized manifold 318. The illustration of the second flow path 317 with multi-position valve 325 and the third flow path 319 with multi-position valve 327 are to illustrate two exemplary locations of a connecting flow path with multi-position valve, other locations are contemplated. When employing a multi-position valve such as in FIG. 3F, only a single multi-position valve in a single additional flow path needs to be provided to couple the first flow path 316 to the pressurized manifold 318. The multi-position valve controls the flow between the pressurized manifold 318 and the first flow path 316 to achieve the disengaged position (FIG. 3A) and the engaged position (FIG. 3B) of the hydraulic fan brake 394.

Accordingly, the hydraulic fan brake 300 provides a non-contacting hydraulic fan brake 300 for the fan 106 (FIG. 1). The hydraulic fan brake 300 may be a valve that is connected to a line that is connected to a pump driven by the low-speed spool (e.g., the gearbox, fan shaft, coupling shaft, low-pressure shaft, low-pressure turbine, or low-pressure compressor). By stopping the flow of fluid to and from the pump, a non-contacting hydraulic braking system may be generated. Optionally, the brake may allow for closing an orifice to meter the speed of the low-speed rotor.

Figure 4A:
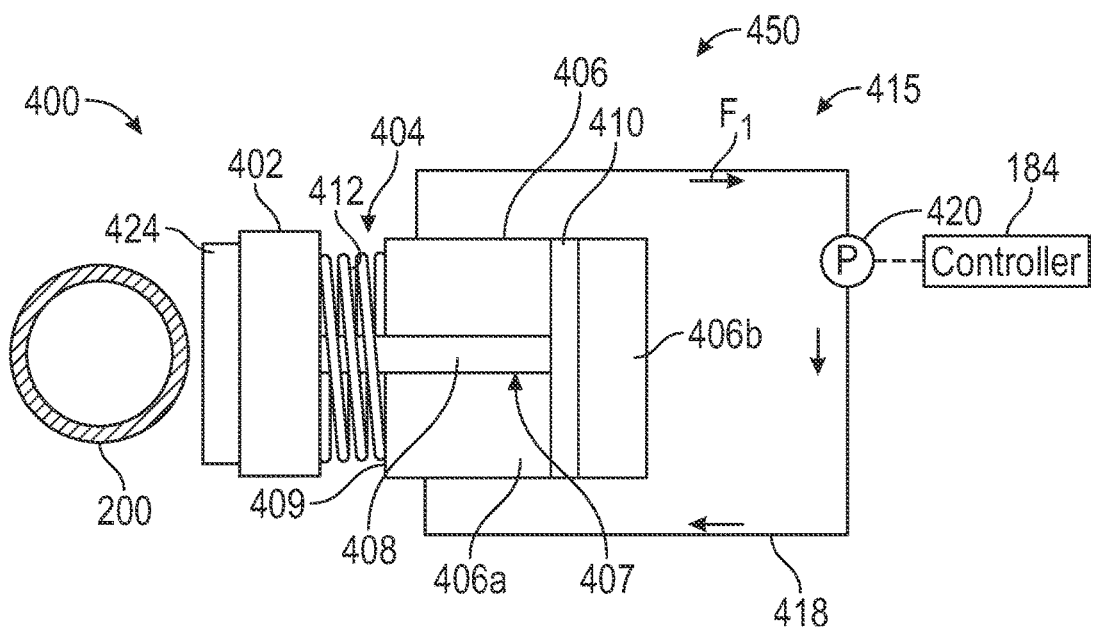
FIG. 4A illustrates a partial schematic, cross-sectional view of a hydraulic fan brake for a gas turbine engine, the hydraulic fan brake being in a disengaged position, according to the present disclosure.
Figure 4B:
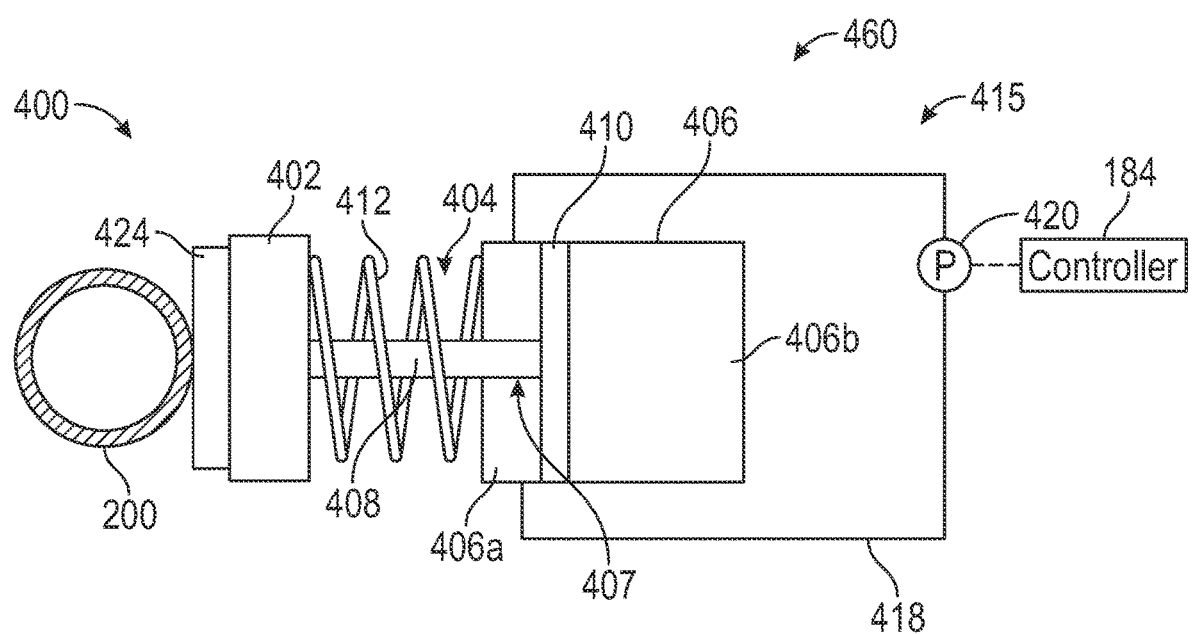
FIG. 4B illustrates a partial schematic, cross-sectional view of a hydraulic fan brake for a gas turbine engine, the hydraulic fan brake being in an engaged position, according to the present disclosure.

FIGS. 4A and 4B illustrate an exemplary hydraulic fan brake 400 that may be located at any of the locations described with respect to FIG. 2. The hydraulic fan brake 400 is illustrated in a disengaged position 450 in FIG. 4A and an engaged position 460 in FIG. 4B. The hydraulic fan brake 400 includes a brake pad 402 and a hydraulic actuator 404. The hydraulic actuator 404 includes a hydraulic cylinder 406, a piston 407 having a piston shaft 408 and a piston head 410, and a biasing member 412. The hydraulic actuator 404 is fluidly coupled to a fluid circuit 415 for supplying fuel or lubricant to the turbine engine 100. The fluid circuit 415 includes a pressurized manifold 418. The pressurized manifold 418 is supplied with an incompressible fluid, such as fuel or oil, via a pump 420. The pump 420 may be any positive displacement pump. In the disengaged position 450 of FIG. 4A, the pump 420 is controlled by the controller 184 to supply a first flow of fluid $F_1$ through the pressurized manifold 418. The first flow of fluid $F_1$ enters a first chamber 406a of the hydraulic cylinder 406. The pressure of the fluid in the first chamber 406a moves the piston head 410 within the hydraulic cylinder 406 toward a second chamber 406b. As the piston head 410 moves, the biasing member 412 is compressed between the brake pad 402 and a surface 409 of the hydraulic cylinder 406. With the biasing member 412 compressed, the piston shaft 408 is retracted within the hydraulic cylinder 406 and, thus, the brake pad 402 is retracted from the rotational component 200 and disengaged from the rotational component 200. In this condition, the rotational component 200 is allowed to rotate. Thus, the hydraulic fan brake 400 is disengaged and no braking of the rotational component 200 occurs in the disengaged position 450. In some examples, the biasing member 412 is a spring, such as a compression spring.

In the engaged position 460 of FIG. 4B, the pump 420 is controlled by the controller 184 to cease flow of the first flow of fluid $F_1$ along the flow path of the pressurized manifold 418. In this condition, the biasing member 412 (which is preloaded) releases the compressed energy pushing the brake pad 402 into contact with the rotational component 200. In this condition, the rotational component 200 is stopped or prevented from rotating by the contact with the brake pad 402, which is held in contact with the rotational component 200 by the force of the biasing member 412. An optional wear coating 424 may be provided on the brake pad 402, the rotational component 200, or both the brake pad 402 and the rotational component 200 to reduce wear between the brake pad 402 and the rotational component 200. Thus, the hydraulic fan brake 400 is engaged and braking of the rotational component 200 occurs in the engaged position 460.

Accordingly, the hydraulic fan brake 400 provides a contacting hydraulic fan brake for the fan. In the hydraulic fan brake 400 of FIGS. 4A and 4B, a fluid circuit, such as a fuel circuit or an oil circuit provides pressure that maintains pressure on a left side of a hydraulic cylinder to maintain a piston-driven brake retracted (e.g., FIG. 4A). A biasing member, such as a preloaded spring, actuates the piston to a closed position (to the left) to extend a brake (e.g., FIG. 4B). Although the example of FIGS. 4A and 4B does not illustrate a valve, a valve may be provided. For example, a valve (such as described with respect to FIGS. 3A to 3F) may be provided, such that, when the valve is opened, the brake is disengaged (e.g., the condition as shown in FIG. 4A), and, when, the valve is closed, the brake is engaged (e.g., the condition as shown in FIG. 4B).

Figure 5:
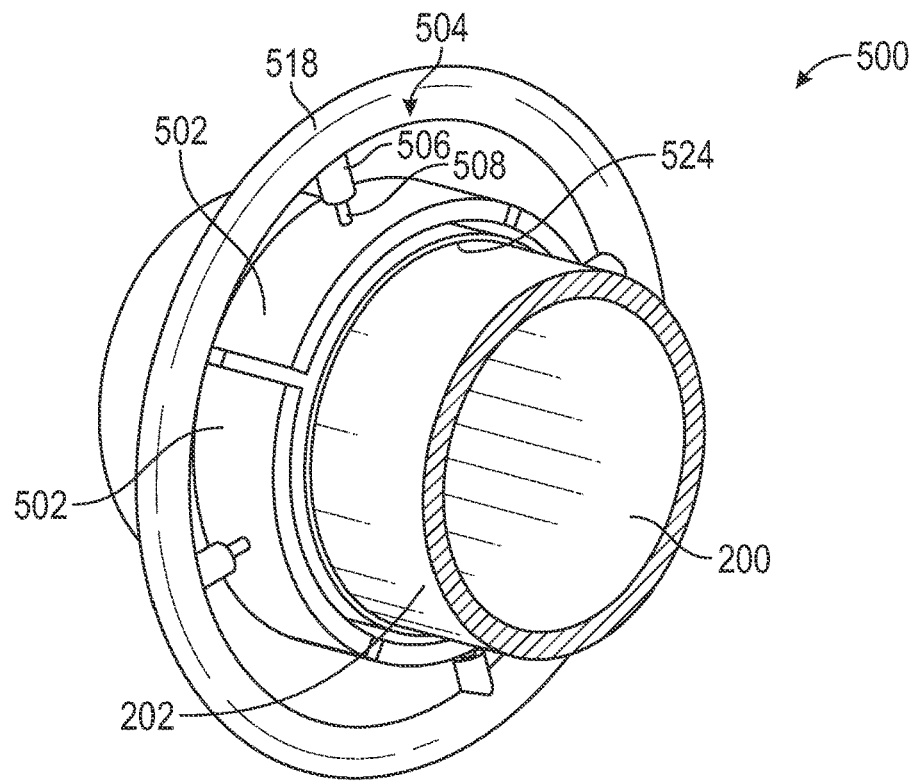
FIG. 5 illustrates a schematic, cross-sectional view of a hydraulic fan brake, according to the present disclosure.
Figure 6:
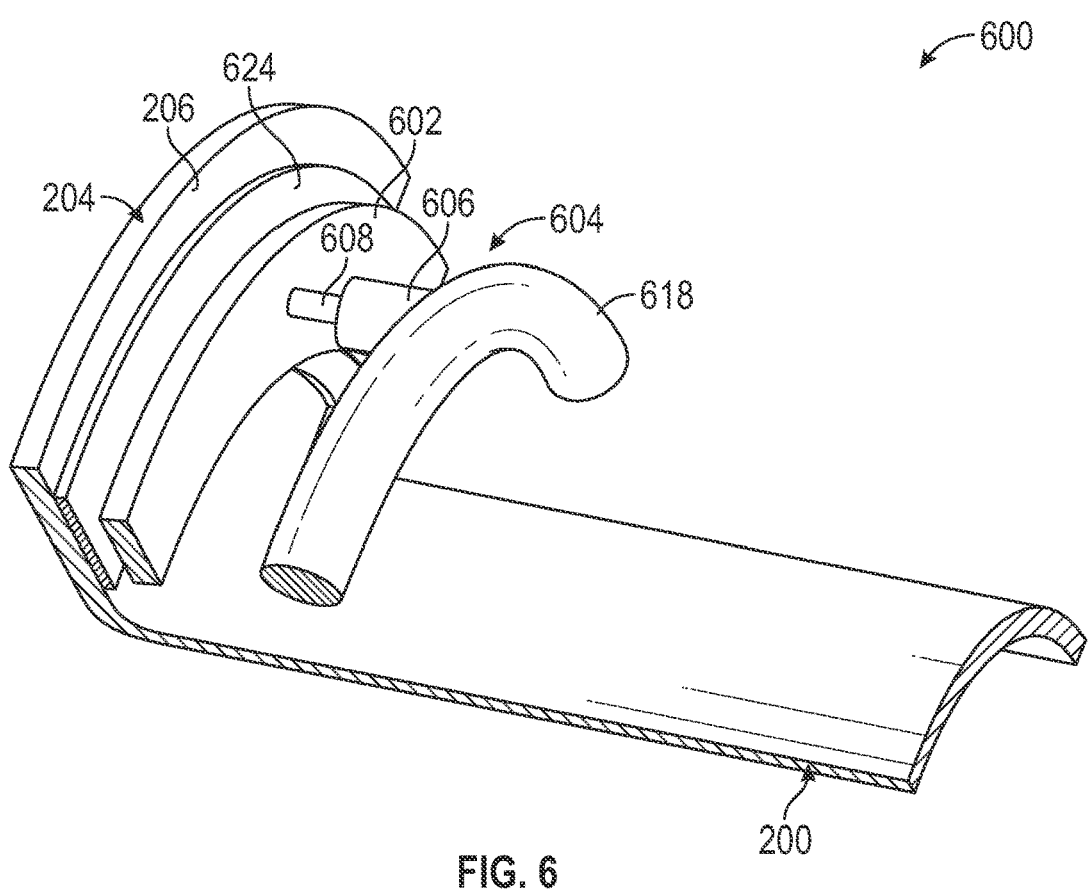
FIG. 6 illustrates a partial schematic, cross-sectional view of a hydraulic fan brake, according to the present disclosure.

FIGS. 5 and 6 illustrate cross-sectional views of exemplary brake assemblies that may be provided with the hydraulic fan brake 400 of FIGS. 4A and 4B. FIG. 5 illustrates an exemplary brake assembly 500. The brake assembly 500 may be located circumferentially around an outer surface 202 of the rotational component 200 such that one or more brake pads 502 move radially to engage and to disengage with the outer surface 202 of the rotational component 200. The brake assembly 500 includes a hydraulic actuator 504 that may be the same as, or similar to, the hydraulic actuator 404 of FIGS. 4A and 4B. Visible in FIG. 5 is a pressurized manifold 518, a hydraulic cylinder 506, and a piston having a piston shaft 508 of the hydraulic actuator 504. As appreciated, the hydraulic actuator 504 includes a piston head of the piston (within the hydraulic cylinder 506 and thus not visible) and a biasing member (omitted for clarity, this may be the biasing member 412). When the hydraulic actuator 504 is operated as described with respect to the hydraulic fan brake 400 of FIGS. 4A and 4B, the one or more brake pads 502 are moved radially inward toward the outer surface 202 to engage with and contact the outer surface 202 to prevent rotation of the rotational component 200 (e.g., the engaged position 460 of FIG. 4B). In the disengaged condition (e.g., the disengaged position 450 of FIG. 4A), the brake pads 502 are moved radially outward away from the outer surface 202, such that there is no engagement or contact with the outer surface 202 and rotation of the rotational component 200 is permitted. As mentioned previously, a wear coating 524 may be provided on one or both of the one or more brake pads 502 or the outer surface 202. The brake assembly 500 of FIG. 5 illustrates four separate brake pads 502, but more or fewer brake pads 502 may be provided. In some examples, a single brake pad 502 is provided. In some examples, the one or more brake pads 502 extend partially around the outer surface 202 or entirely around the outer surface 202 (such a condition is shown in FIG. 5).

FIG. 6 illustrates a cross-sectional, partial view, of an exemplary brake assembly 600. The brake assembly 600 may be located such that one or more brake pads 602 move axially to engage and to disengage with an axial face 206 of a radially extending portion 204 of the rotational component 200. The brake assembly 600 includes a hydraulic actuator 604 that may be the same as, or similar to, the hydraulic actuator 404 of FIGS. 4A and 4B. Visible in FIG. 6 is a pressurized manifold 618, a hydraulic cylinder 606, and a piston having a piston shaft 608 of the hydraulic actuator 604. As appreciated, the hydraulic actuator 604 includes a piston head (within the hydraulic cylinder 606 and thus not visible) and a biasing member (omitted for clarity, this may be the biasing member 412). When the hydraulic actuator 604 is operated as described with respect to the hydraulic fan brake 400 of FIGS. 4A and 4B, the one or more brake pads 602 are moved axially toward the axial face 206 to engage with and contact the axial face 206 to prevent rotation of the rotational component 200 (e.g., the engaged position 460 of FIG. 4B). In the disengaged condition (e.g., the disengaged position 450 of FIG. 4A), the brake pads 602 are moved axially away from the axial face 206 such that there is no engagement or contact with the axial face 206, and rotation of the rotational component 200 is permitted. As mentioned previously, a wear coating 624 may be provided on one or both of the one or more brake pads 602 or the axial face 206. The brake assembly 600 of FIG. 6 illustrates a single brake pad 602, but more may be provided. In some examples, the one or more brake pads 602 extend partially around the axial face 206 (which may extend circumferentially around a portion of or an entirety of the rotational component 200) or entirely around the axial face 206.

The hydraulically-actuated brakes of FIGS. 5 and 6 may be applied to a gas turbine engine low-speed spool that provides either a varying resistive force or a constant resistive force to a shaft turning when commanded by an engine control signal or passively. The hydraulic fan brakes may be concentric pads arranged in sectors that translate radially inward against a pre-determined section of the shaft to restrict motion (e.g., FIG. 5), or an arrangement of axially translating wear surfaces that restricts motion of a low-pressure airfoil disk (e.g., FIG. 6). In both examples, the hydraulic fan brakes have a common pressurized manifold between all brake pads.

Figure 7:
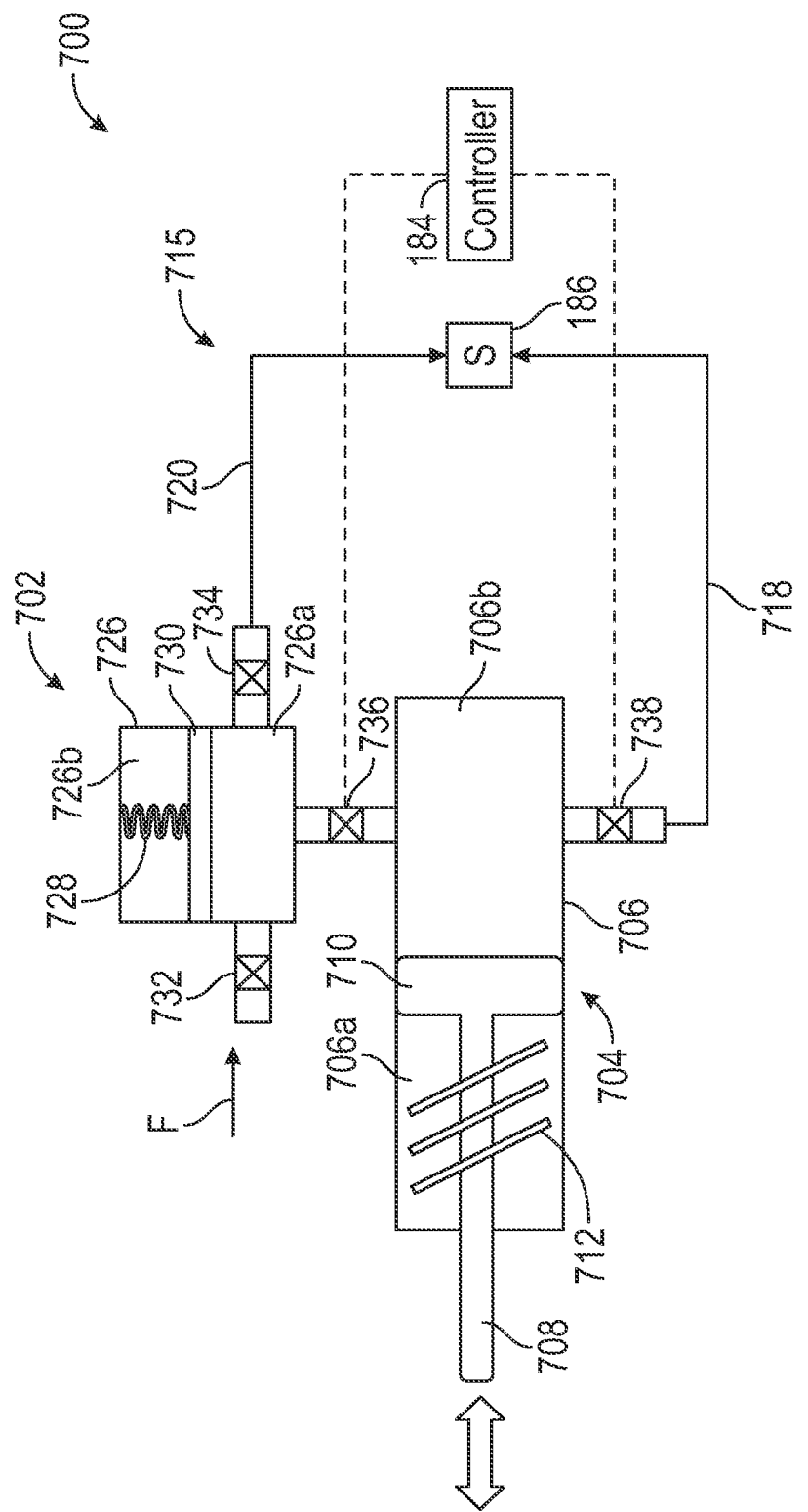
FIG. 7 illustrates a partial schematic view of a hydraulic fan brake for a gas turbine engine, according to the present disclosure.

FIG. 7 is a schematic diagram illustrating another exemplary hydraulic fan brake 700. Although a brake pad is omitted for clarity from the hydraulic fan brake 700, the brake assembly 500 or the brake assembly 600 may be employed with the hydraulic fan brake 700. Alternatively, the hydraulic fan brake 700 may be coupled to a valve and a pump gear as described with respect to FIGS. 3A to 3C.

The hydraulic fan brake 700 includes a hydraulic accumulator 702 and a hydraulic actuator 704. The hydraulic accumulator 702 includes a hydraulic cylinder 726 having a first chamber 726a, a second chamber 726b, a biasing member 728, and a piston head 730 disposed within the hydraulic cylinder 726. A check valve 732 is provided at an inlet of the hydraulic cylinder 726 and a pressure relief valve 734 is provided at an outlet of the hydraulic cylinder 726. The pressure relief valve 734 may allow fluid to flow along a fluid line 720 from the hydraulic accumulator 702 to return to a fluid system 186, which may be a fuel, oil, or a lubrication system of the turbine engine 100 (FIG. 1).

The hydraulic actuator 704 is fluidly coupled to a fluid circuit 715 having a fluid line 718, the fluid line 720, and a fluid line in which the check valve 732 is located. The hydraulic actuator 704 includes a hydraulic cylinder 706 having a first chamber 706a and a second chamber 706b. The hydraulic actuator 704 includes a piston having a piston head 710 and a piston shaft 708, and a biasing member 712. A brake engage valve 736 is provided at an inlet of the hydraulic cylinder 706 and a brake disengage valve 738 is provided at an outlet of the hydraulic cylinder 706. The brake engage valve 736 and the brake disengage valve 738 are controlled by the controller 184. The brake disengage valve 738 may allow fluid to flow along the fluid line 718 from the hydraulic actuator 704 to return to the fluid system 186.

During engine operation, a fluid flow F is caused to flow from a fluid system, which may be the fluid system 186 or a different fuel system or oil system, into the hydraulic accumulator 702. The fluid flow F flows through the check valve 732, which is a pressurizing, one-way, check valve. The fluid accumulates within the first chamber 726a compressing the biasing member 728 with the piston head 730 as the fluid accumulates within the first chamber 726a. A predetermined pressure may be allowed in the hydraulic accumulator 702 and, when exceeded, fluid may be allowed to exit the first chamber 726a by way of the pressure relief valve 734 to return to the fluid system 186. In this manner, during engine operation, pressurized fluid is allowed to accumulate within the hydraulic accumulator 702.

When engine operation is ceased, the flow into the hydraulic accumulator 702 is stopped and the brake may be actuated. When the brake is desired to be engaged against the rotational component (omitted for clarity), the controller 184 activates the brake engage valve 736 to permit the accumulated pressurized fluid in the first chamber 726a to enter the second chamber 706b of the hydraulic actuator 704 to compress the biasing member 712 with the piston head 710 toward the first chamber 706a. The piston shaft 708 may move to operate a brake pad (e.g., brake pad 402, 502, or 602) or to close a valve associated with a rotational device (e.g., valve 314 and rotational device 302), thus, activating braking of the rotational component.

In some examples, the biasing member 728 is a spring, such as a compression spring. In some examples, the biasing member 728 is a flexible diaphragm such that the hydraulic accumulator 702 includes a flexible diaphragm having an internal volume. The flexible diaphragm is pressurized by a fluid, such as gas, within the internal volume. Similar to the previous description, fluid may flow through the check valve 732 and fill the internal volume of the flexible diaphragm. When the brake engage valve 736 is opened, the pressurized fluid within the flexible diaphragm may be flow out of the internal volume and into the second chamber 706b to actuate the brakes in the aforementioned manner.

When the brake is desired to be disengaged from the rotational component, the controller 184 activates the brake disengage valve 738 to permit the fluid that is now filling the second chamber 706b to exit the hydraulic cylinder 706 and flow through the fluid line 718 to the fluid system 186. With no fluid in the second chamber 706b (and no fluid in the hydraulic accumulator 702, since the flow F has stopped when engine operation is ceased), the biasing member 712 extends, moving the piston shaft 708 and the piston head 710 toward the second chamber 706b. This disengages the brake, as described with respect to FIGS. 3A to 6.

Stated another way, the hydraulic accumulator 702 stores working fluid at pressure for maintaining hydraulic power for braking when the turbine engine 100 is not receiving fuel flow F. The check valve 732 pressurizes the hydraulic accumulator 702, compressing the piston head 730, and holding pressure up to pressure relief valve 734 setpoint. The brake is deployed when the brake engage valve 736 is commanded to open, releasing accumulator fluid through an extend port and driving the hydraulic actuator 704 to close the brake. The brake is retracted when the brake disengage valve 738 is opened to depressurize the entire system and the hydraulic cylinder biasing member 712 retracts the brakes.

The hydraulic fan brakes described with respect to FIGS. 3A to 7 are described as being actively controlled fan brakes that are controlled to engage and to disengage with a controller 184. Alternatively, or additionally, the hydraulic fan brakes described with respect to FIGS. 3A to 7 may be passively actuated brakes that actuate automatically upon cessation of engine operation. For example, in the hydraulic fan brake 300 of FIGS. 3A to 3D, the pump 320 may automatically cease operation when the turbine engine 100

(FIG. 1) is stopped (e.g., the operation of the pump 320 may be tied to the operation of the turbine engine 100 such that when the turbine engine 100 is stopped, the pump 320 is stopped). With the pump 320 stopped, the pressurized fluid no longer flows into the first chamber 306a, and the energy stored in the compressed biasing member 312 automatically advances the piston head 310 and the piston shaft 308 to close the valve 314 and to create the hydraulic lock within the rotational device 302 or gear pump 370 to brake the rotational component 200.

Likewise, in the aspects of FIGS. 4A and 4B, the pump 420 may automatically cease operation when the turbine engine 100 (FIG. 1) is stopped. With the pump 420 stopped, the pressurized fluid no longer flows into the first chamber 406a, and the energy stored in the compressed biasing member 412 automatically advances the brake pad 402 toward the rotational component 200 to engage with and contact the rotational component 200 to stop rotation thereof.

Finally, as shown in FIG. 7, the brake engage valve 736 may be automatically opened when pressure into the hydraulic accumulator 702 is stopped by cessation of the turbine engine 100. With the brake engage valve 736 automatically opened, the hydraulic fan brake 700 may operate in the previously described manner.

Figure 8:
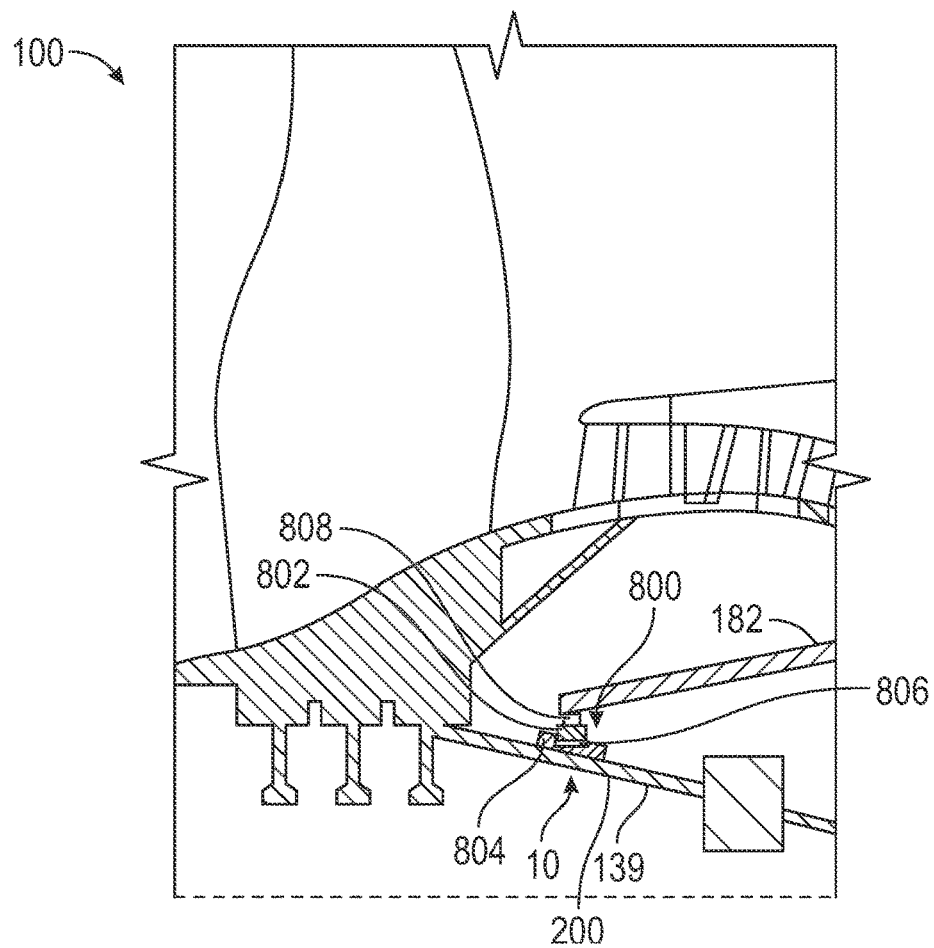
FIG. 8 illustrates a partial schematic, cross-sectional view of a gas turbine engine having a hydraulic fan brake, according to the present disclosure.
Figure 9:
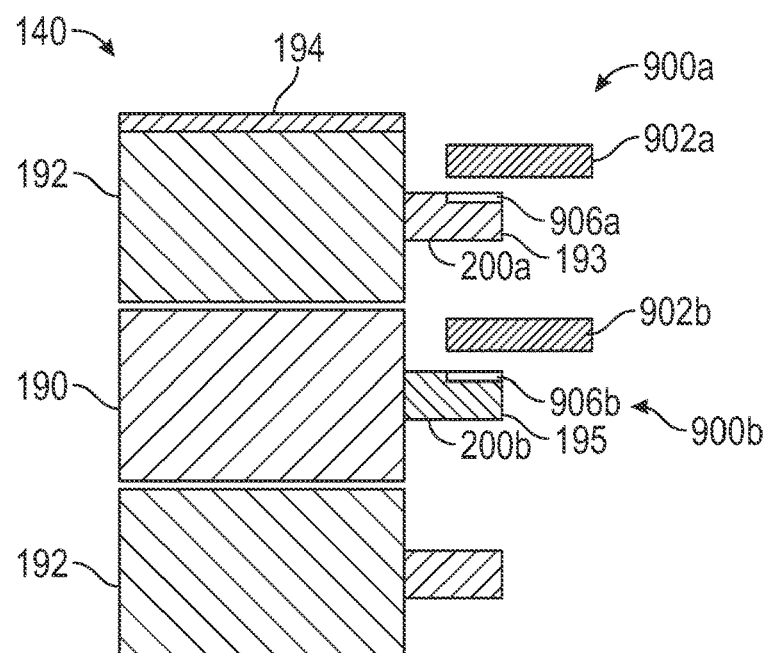
FIG. 9 illustrates a cross-sectional view of a gearbox assembly of a gas turbine engine having a hydraulic fan brake, according to the present disclosure.

FIG. 8 illustrates a partial schematic, cross-sectional view of a gas turbine engine having a hydraulic fan brake, according to the present disclosure. FIG. 9 illustrates a cross-sectional view of a gearbox assembly of a gas turbine engine having a hydraulic fan brake, according to the present disclosure. FIGS. 8 and 9 both illustrate exemplary embodiments of hydraulic fan brakes having one or more locking features. As will be described in more detail, when actuated (as in a manner previously described), the one or more locking features engage a groove or a slot in a rotational component to prevent rotation of the rotational component, and, thus, rotation of the fan blades, such as described herein.

FIG. 8 illustrates the turbine engine 100 having a hydraulic fan brake 800 at the first location 10. The hydraulic fan brake 800 may be fluidly coupled to a hydraulic actuator and hydraulic manifold, such as those described with respect to FIGS. 3A to 3B, 3E, 3F, 4A to 4B, and 7. Accordingly a description of operation of the specific hydraulic actuator employed with the hydraulic fan brake 800 is not repeated for brevity. In fact, the hydraulic fan brake 800 operates substantially the same as the hydraulic fan brake 400 that operates the brake pad 402 (FIG. 4A, 4B).

The hydraulic fan brake 800 includes a disengaged position (FIG. 8) and an engaged position (not illustrated). In the disengaged position, fluid flows through the hydraulic actuator, such as described with respect to FIG. 4A. As described above, the flow of fluid through the hydraulic manifold and hydraulic actuator results in retracting a piston shaft 808 within the hydraulic cylinder. This, in turn, retracts a locking feature 802 coupled to the piston shaft 808. In such a condition, the locking feature 802 does not engage the rotational component 200, which, in the example of FIG. 8, is the fan shaft 139. Thus, in the disengaged position of FIG. 8, the rotational component 200 is allowed to rotate.

To move from the disengaged position of FIG. 8 to the engaged position, flow through the hydraulic manifold is stopped, as previously described. This causes the spring (e.g., the biasing member 412 of FIGS. 4A and 4B) to extend pushing the locking feature 802 into contact with a groove 806 on the rotational component 200. FIG. 8 illustrates the groove 806 within a component 804 mounted to the rotational component 200. However, the groove 806 may be located directly within the body of the rotational component 200.

In the example of FIG. 8, the piston shaft 808 and the locking feature 802 are coupled to the engine frame 182, however, other static structures are contemplating for mounting the locking feature 802. In some examples, the locking feature 802 may also operate as the piston shaft 808 such that the locking feature 802 is directly caused by the hydraulic actuator to engage and disengage the rotational component. In the example of FIG. 8, a single locking feature 802 and a single groove 806 are illustrated, however, more are contemplated.

Although the hydraulic fan brake 800 is illustrated at the first location 10 engaging the fan shaft 139, other locations and other rotational components are contemplated, such as described herein. One such alternative location is illustrated in FIG. 9, with a hydraulic fan brake located at the gearbox assembly 140 of the second location 20 (FIG. 2).

In the example of FIG. 9, the hydraulic fan brake is located at the gearbox assembly 140. The gearbox assembly 140 includes a sun gear 190, a plurality of planet gears 192 circumferentially disposed about the sun gear 190, and an annular ring gear 194 disposed circumferentially around the plurality of planet gears 192.

There are multiple rotational components in the gearbox assembly 140 to locate the hydraulic fan brake. For example, the rotational component may be a rotational component 200a, which may be a rotating shaft 193 extending from one or more planet gears 192 of the plurality of planet gears 192. A hydraulic fan brake 900a may be associated with the one or more planet gears 192. In this example, a locking feature 902a is caused to engage and disengage with a groove 906a in the rotating shaft 193 of the one or more planet gears 192 in the same manner as described with respect to FIG. 8. In another example, the rotational component may be a rotational component 200b, which may be a rotating shaft 195 extending from the sun gear 190. A hydraulic fan brake 900b may be associated with the sun gear 190. In this example, a locking feature 902b is caused to engage and disengage with a groove 906b in the rotating shaft 195 of the sun gear 190 in the same manner as described with respect to FIG. 8.

Although a single locking feature 902a, 902b and a single groove 906a, 906b are illustrated, more are contemplated. The groove 806, 906a, or 906b may be a hole, a slot, a depression, an indentation, etc., within the component to receive the locking feature. In some examples, the groove may be a series of holes, grooves, slots, depressions, indentations, etc. Although shown and described as a locking feature and a groove, any of the hydraulic fan brakes 800, 900a, 900b may include a ratchet arrangement, such as a ratch and pawl. The locking feature may be a locking tab having a shape that mates with a corresponding opening in the rotational component 200. The locking feature may be rectangular, cylindrical, or other shape. The locking feature may contact or may extend through the rotational component 200. That is, the hydraulic fan brakes 800, 900a, 900b may include a number of systems, devices, and arrangements that include a "male" portion coupled to the static component and hydraulically actuated and a "female" portion coupled to the rotational component to receive the male portion and prevent rotation of the rotational component.

Accordingly, the hydraulic fan brakes of the present disclosure may be passive or may be controlled brakes. In some examples, the controller may be provided as a fail-safe to actuate the hydraulic fan brakes in instances when passive actuation fails or in instances when actuation is desired outside of the passive control parameters or in both instances. As described herein, the present disclosure provides hydraulically actuated brakes that are applied to a gas turbine engine low-speed spool (e.g., low-speed rotor system) that provides either a varying force or a constant resistive or a braking force to a rotating shaft. The resistive force may be commanded by an engine control signal (e.g., by way of the controller 184) or may be passive. The hydraulic fan brakes of the present application may be driven by engine fuel pressure stored at a pressure in an accumulator, pressurized manifold, or another aircraft hydraulic system.

In some examples, engine control signals may activate the hydraulic fan brake of the present disclosure when a windmilling sensing condition is detected, and then releases a resistive force after (1) a pre-determined amount of time or (2) upon a command signal from the engine, whichever one occurs first. In some examples, engine command signals may originate from a sensor, such as a torque sensor that commands the hydraulic fan brake into the engaged position when either (1) a measured torque of the low-pressure spool, (2) an engine fuel flow, (3) an accessory speed or power, and/or (4) engine pressure or temperature exceeds a predetermined value.

According to the present disclosure, the hydraulic fan brakes may have one or more of the following options: (1) the brakes are preloaded to fail open, (2), the brakes may actuate when two or more faults are present during flight, (3), the brakes may employ mechanical contact/interference with a fan rotor to achieve braking, (4) the brakes may employ a hydraulic force/torque on the fan rotor to achieve braking, (5), a cooler may be provided on the recirculating fluid employed for the brake, (6), the brakes may automatically activate due to engine shutdown, or any combination of the aforementioned options.

Further aspects are provided by the subject matter of the following clauses.

A turbine engine having a longitudinal centerline axis includes a fan comprising a plurality of fan blades configured to rotate about the longitudinal centerline axis, a rotational component coupled to the fan, a fluid circuit configured to provide fuel or lubricant to the turbine engine, and a hydraulic fan brake coupled to the fluid circuit and configured to prevent rotation of the rotational component, thus preventing rotation of the fan.

A turbine engine having a longitudinal centerline axis, the turbine engine comprising a fan comprising a plurality of fan blades that rotate about the longitudinal centerline axis, a rotational component coupled to the fan, a fluid circuit for supplying fuel or lubricant to the turbine engine, and a hydraulic fan brake coupled to the fluid circuit to prevent rotation of the rotational component, thus preventing rotation of the fan, the hydraulic fan brake comprising a hydraulic cylinder fluidly coupled to the fluid circuit and a valve coupled to the hydraulic cylinder and having a first valve position that disengages the hydraulic fan brake to allow rotation of the rotational component and a second valve position that engages the hydraulic fan brake to prevent rotation of the rotational component.

The turbine engine of any preceding clause, further comprising a piston disposed at least partially within the hydraulic cylinder, wherein the valve is coupled to the piston such that movement of the piston causes the valve to be in the first valve position or the second valve position.

The turbine engine of any preceding clause, wherein the first valve position is an open position and the second valve position is a closed position.

The turbine engine of any preceding clause, wherein the hydraulic fan brake comprises a single gear rotationally coupled to the rotational component, and wherein, in the first valve position, the single gear rotates with the rotational component, and in the second valve position, the single gear is prevented from rotating, thus preventing rotation of the rotational component.

The turbine engine of any preceding clause, the hydraulic fan brake comprising a spring, wherein when the fuel or the lubricant flows through the fluid circuit, the spring compresses and the valve is in the first valve position, thus, permitting rotation of the rotational component, and wherein when the fuel or the lubricant ceases flowing through the fluid circuit, the spring extends, causing the valve to move to the second valve position, thus, preventing rotation of the rotational component.

The turbine engine of any preceding clause, wherein the rotational component is a low-pressure shaft of the turbine engine.

The turbine engine of any preceding clause, wherein the rotational component is directly coupled or indirectly coupled to a low-pressure shaft of the turbine engine.

The turbine engine of any preceding clause, wherein the hydraulic fan brake comprises a brake pad.

The turbine engine of any preceding clause, wherein the brake pad is arranged to contact an axial face of the rotational component.

The turbine engine of any preceding clause, wherein the brake pad is arranged to contact a radial surface of the rotational component.

The turbine engine of any preceding clause, wherein the hydraulic fan brake comprises a gear pump.

The turbine engine of any preceding clause, wherein the valve is fluidly coupled to a flow path, and, wherein the first valve position permits flow through the flow path to rotate gears of the gear pump, thus permitting rotation of the rotational component and the second valve position prevents flow through the flow path, thus hydraulically locking the gear pump to prevent rotation of the rotational component.

The turbine engine of any preceding clause, wherein the flow path is a first flow path, the valve being coupled to a second flow path, wherein the second flow path fluidly couples the fluid circuit to the first flow path.

The turbine engine any preceding clause, wherein the valve is a first valve, the hydraulic fan brake comprising a second valve in the second flow path, the second valve controlling flow between the fluid circuit and the first flow path.

The turbine engine of the preceding clause, wherein the fluid circuit includes a fuel circuit configured to provide fuel to operate the turbine engine.

The turbine engine of any preceding clause, wherein the fluid circuit includes a lubricant system configured to provide a lubricant to one or more components of the turbine engine.

The turbine engine of any preceding clause, wherein the hydraulic fan brake is a passive brake automatically actuated upon cessation of operation of the turbine engine.

The turbine engine of any preceding clause, wherein the hydraulic fan brake includes a hydraulic actuator configured to actuate braking of the fan.

The turbine engine of any preceding clause, wherein the hydraulic fan brake includes a rotational device rotationally coupled to the shaft, the rotational device configured to allow or prevent rotation of the shaft based on the condition of the hydraulic fan brake.

The turbine engine of any preceding clause, wherein the hydraulic fan brake includes a valve, and, wherein when the valve is open, the rotational device allows rotation of the shaft and when the valve is closed, the rotational device prevents rotation of the shaft.

The turbine engine of any preceding clause, wherein the rotational device is a gear pump rotationally coupled to the rotational component.

The turbine engine of any preceding clause, wherein the rotational device is a single gear rotationally coupled to the rotational component.

The turbine engine of any preceding clause, wherein the fluid circuit includes a pressurized manifold configured to supply a fuel or a lubricant to the engine and a flow path configured to control a rotational device of the hydraulic fan brake.

The turbine engine of any preceding clause, wherein the pressurized manifold is fluidly isolated from the flow path.

The turbine engine of any preceding clause, wherein the flow path is a first flow path, the fluid circuit further comprises a second flow path with a first gate valve and a third flow path with a second gate valve, wherein the first gate valve and the second gate valve control fluid flow between the first flow path and the pressurized manifold.

The turbine engine of any preceding clause, wherein the flow path is a first flow path, the fluid circuit further comprises a second flow path with a multi-position valve, wherein the multi-position valve controls fluid flow between the first flow path and the pressurized manifold.

The turbine engine of any preceding clause, further comprising a heat rejection device configured to dissipate waste heat generated by the rotational device.

The turbine engine of any preceding clause, wherein the hydraulic fan brake includes a hydraulic actuator, a valve, and a rotational device, wherein the valve is configured to open to disengage braking of the fan and the valve is configured to close to engage braking of the fan.

The turbine engine of any preceding clause, wherein the hydraulic fan brake is a non-contacting brake.

The turbine engine of any preceding clause, wherein the hydraulic fan brake includes a brake pad configured to contact the rotational component.

The turbine engine of any preceding clause, wherein the brake pad is a circumferential brake pad configured to engage an outer surface of the rotational component.

The turbine engine of any preceding clause, wherein the brake pad is an axial brake pad configured to engage an axial face of the rotational component.

The turbine engine of any preceding clause, further comprising a wear coating surrounding the rotational component.

The turbine engine of any preceding clause, further comprising a wear coating between the brake pad and the rotational component.

The turbine engine of any preceding clause, wherein the rotational component is a component of the low-pressure spool.

The turbine engine of any preceding clause, wherein the rotational component is the low-speed shaft.

The turbine engine of any preceding clause, wherein the rotational component is the fan shaft.

The turbine engine of any preceding clause, wherein the rotational component is a power take-off device, the hydraulic fan brake coupled to the power take-off device.

The turbine engine of any preceding clause, wherein the rotational component is a component of a gearbox assembly operationally coupling the low-pressure shaft to the fan, the hydraulic fan brake being coupled to the gearbox assembly.

The turbine engine of any preceding clause, wherein the rotational component is a bearing assembly of the turbine engine.

The turbine engine of any preceding clause, wherein the rotational component is a component of an accessory gearbox assembly.

The turbine engine of any preceding clause, wherein the hydraulic fan brake is coupled to the turbine engine in a sump region of the turbine engine.

The turbine engine of any preceding clause, wherein the hydraulic fan brake comprises a locking feature.

The turbine engine of the preceding clause, wherein the locking feature is coupled to a static component and is arranged to contact a groove associated with the rotational component.

The turbine engine of any preceding clause, wherein the hydraulic fan brake comprises a male member for extending into a female member.

The turbine engine of the preceding clause, wherein the male member is a locking feature and the female member is a groove.

The turbine engine of the preceding clause, wherein the locking feature is arranged to contact the groove to prevent rotation of the rotational component.

The turbine engine of any preceding clause, wherein the locking feature is coupled to a static component and the groove is associated with the rotational component.

The turbine engine of the preceding clause, wherein the groove is located directly in the rotational component.

The turbine engine of any preceding clause, wherein the groove is located in a component coupled to the rotational component.

The turbine engine of any preceding clause, wherein the locking feature is arranged on the engine frame and the groove is arranged on the fan shaft.

The turbine engine of any preceding clause, further comprising a gearbox assembly having a sun gear, a plurality of planet gears circumferentially disposed around the sun gear, and an annular ring gear circumferentially disposed around the plurality of planet gears.

The turbine engine of the preceding clause, wherein the groove is located on a rotating shaft of one or more planet gears of the plurality of planet gears.

The turbine engine of any preceding clause, wherein the groove is located on a rotating shaft of the sun gear.

The turbine engine of any preceding clause, wherein the piston shaft is configured to extend the locking feature into the groove.

The turbine engine of any preceding clause, wherein the hydraulic brake includes a ratchet and pawl.

A turbine engine having a longitudinal centerline axis. The turbine engine having a fan comprising a plurality of fan blades that rotate about the longitudinal centerline axis, a rotational component coupled to the fan, a fluid circuit for supplying fuel or lubricant to the turbine engine, and a hydraulic fan brake coupled to the fluid circuit to prevent rotation of the rotational component, thus preventing rotation of the fan. The hydraulic fan brake includes a hydraulic cylinder fluidly coupled to the fluid circuit, a piston disposed at least partially within the hydraulic cylinder, a brake pad coupled to the piston shaft, and a biasing member disposed between the hydraulic cylinder and the brake pad, wherein, the piston has a first position that disengages the brake pad from the rotational component to allow rotation of the rotational component and a second position that engages the brake pad on the rotational component to prevent rotation of the rotational component.

The turbine engine of any preceding clause, wherein the fluid circuit includes a fuel circuit to supply fuel to operate the turbine engine.

The turbine engine of any preceding clause, wherein the fluid circuit includes a lubricant system for supplying a lubricant to one or more components of the turbine engine.

The turbine engine of any preceding clause, wherein the hydraulic fan brake is a passive brake automatically actuated upon cessation of operation of the turbine engine.

The turbine engine of any preceding clause, wherein the rotational component is a low-pressure shaft of the turbine engine.

The turbine engine of any preceding clause, wherein the rotational component is directly coupled or indirectly coupled to a low-pressure shaft of the turbine engine.

The turbine engine of any preceding clause, wherein the brake pad is arranged to contact an axial face of the rotational component.

The turbine engine of any preceding clause, wherein the brake pad is arranged to contact a radial surface of the rotational component.

The turbine engine of any preceding clause, further comprising a wear coating surrounding the rotational component.

The turbine engine of any preceding clause, further comprising a wear coating between the brake pad and the rotational component.

The turbine engine of any preceding clause, wherein the rotational component is a component of the low-pressure spool.

The turbine engine of any preceding clause, wherein the rotational component is the low-speed shaft.

The turbine engine of any preceding clause, wherein the rotational component is the fan shaft.

The turbine engine of any preceding clause, wherein the rotational component is a power take-off device, the hydraulic fan brake coupled to the power take-off device.

The turbine engine of any preceding clause, wherein the rotational component is a component of a gearbox assembly operationally coupling the low-pressure shaft to the fan, the hydraulic fan brake being coupled to the gearbox assembly.

The turbine engine of any preceding clause, wherein the rotational component is a bearing assembly of the turbine engine.

The turbine engine of any preceding clause, wherein the rotational component is a component of an accessory gearbox assembly.

The turbine engine of any preceding clause, wherein the hydraulic fan brake is coupled to the turbine engine in a sump region of the turbine engine.

A method of operating the turbine engine of any preceding clause.

A method of preventing windmilling in the turbine engine of any preceding clause.

The method of any preceding clause, ceasing operating of the turbine engine causing a supply of the fuel or the lubricant to cease flowing through the fluid circuit, and preventing rotation of the fan due to the ceasing of the fuel or the lubricant flow in the fluid circuit.

The method of any preceding clause, wherein preventing rotation of the fan comprises actuating the piston to close the valve, and closing the valve due to the ceasing of the flow of the fuel or the lubricant.

The method of any preceding clause, wherein preventing rotation of the fan comprises hydraulically locking a gear pump such that the rotational component does not rotate.

The method of any preceding clause, wherein preventing rotation of the fan comprises actuating a brake pad to engage the rotational component.

The method of any preceding clause, further comprising providing a wear coating between the brake pad and the rotational component.

Although the foregoing description is directed to the preferred embodiments of the present disclosure, other variations and modifications will be apparent to those skilled in the art and may be made without departing from the spirit or the scope of the disclosure. Moreover, features described in connection with one embodiment of the present disclosure may be used in conjunction with other embodiments, even if not explicitly stated above.

The invention claimed is:

1. A turbine engine having a longitudinal centerline axis, the turbine engine comprising:
    a fan comprising a plurality of fan blades that rotate about the longitudinal centerline axis;
    a rotational component coupled to the fan;
    a fluid circuit for supplying a fluid to the turbine engine; and
    a hydraulic fan brake in fluid communication with the fluid circuit to prevent rotation of the rotational component, thus preventing rotation of the fan, the hydraulic fan brake comprising:
        a hydraulic cylinder fluidly coupled to the fluid circuit;
        a gear pump rotationally coupled with the rotational component; and
        a valve fluidly coupled to the hydraulic cylinder, the valve being moveable between a first valve position, in which the hydraulic fan brake is in a disengaged configuration that permits rotation of the rotational component, and a second valve position, in which the hydraulic fan brake is in an engaged configuration that prevents rotation of the rotational component via the gear pump.

2. The turbine engine of claim 1, wherein the first valve position is an open position of the valve, and the second valve position is a closed position of the valve.

3. The turbine engine of claim 1, the hydraulic fan brake further comprising a biasing member,
    wherein, when the fluid flows through the fluid circuit, the biasing member compresses and the valve is in the first valve position, thus permitting rotation of the rotational component, and
    wherein, when the fluid ceases flowing through the fluid circuit, the biasing member extends and causes the valve to move to the second valve position, thus preventing rotation of the rotational component.

4. The turbine engine of claim 1, wherein the hydraulic fan brake is a passive brake automatically actuated upon cessation of operation of the turbine engine.

5. The turbine engine of claim 1, wherein the rotational component is a low-pressure shaft of the turbine engine or the rotational component is coupled to the low-pressure shaft of the turbine engine.

6. The turbine engine of claim 1, the hydraulic fan brake further comprising a piston disposed at least partially within the hydraulic cylinder, and
    wherein the valve is coupled to the piston such that movement of the piston causes the valve to be in the first valve position or the second valve position.

7. The turbine engine of claim 1, wherein the hydraulic fan brake further comprises a locking feature.

8. The turbine engine of claim 7, wherein the locking feature is coupled to a static component and is arranged to contact a groove associated with the rotational component or wherein the locking feature is a locking tab arranged to contact or extend through the rotational component.

9. The turbine engine of claim 1, wherein the valve is fluidly coupled to a flow path, and,
wherein, with the valve in the first valve position, flow is permitted through the flow path to rotate gears of the gear pump, thus permitting rotation of the rotational component, and, with the valve in the second valve position, flow is prevented through the flow path, thus hydraulically locking the gear pump to prevent rotation of the rotational component.

10. The turbine engine of claim 1, further comprising a first flow path and a second flow path, the hydraulic cylinder fluidly coupled to the first flow path and the valve fluidly coupled to the second flow path, wherein the second flow path fluidly couples the fluid circuit to the first flow path.

11. The turbine engine of claim 10, wherein the valve is a first valve, the hydraulic fan brake further comprising a second valve arranged along the second flow path, the second valve controlling flow between the fluid circuit and the first flow path.

12. A method of preventing windmilling in the turbine engine of claim 1, the method comprising:
ceasing operation of the turbine engine causing a supply of the fluid to cease flowing through the fluid circuit; and
preventing rotation of the fan due to the ceasing of flow of the fluid in the fluid circuit.

13. The method of claim 12, wherein preventing rotation of the fan comprises:
actuating a piston of the hydraulic fan brake to close the valve; and
closing the valve due to the ceasing of flow of the fluid in the fluid circuit.

14. The method of claim 12, wherein preventing rotation of the fan comprises hydraulically locking the gear pump of the hydraulic fan brake such that the rotational component does not rotate.

15. The turbine engine of claim 1, wherein the fluid is a fuel or a lubricant.

16. The turbine engine of claim 15, wherein the fluid circuit includes a fuel circuit for supplying the fuel to operate the turbine engine or a lubricant system for supplying the lubricant to one or more components of the turbine engine.

17. The turbine engine of claim 1, wherein the gear pump includes a gear pump housing and at least two gears disposed within the gear pump housing.

18. The turbine engine of claim 17, wherein, with the valve in the first valve position, the fluid from the fluid circuit flows through the gear pump housing and causes the at least two gears to rotate, and
wherein, with the valve in the second valve position, flow of the fluid from the fluid circuit is not permitted through the gear pump housing.

19. The turbine engine of claim 17, wherein the gear pump further includes at least one gear shaft, the at least one gear shaft being coupled to the rotational component and to at least one gear of the at least two gears.

* * * * *